(12) United States Patent
Nonaka et al.

(10) Patent No.: US 7,187,627 B2
(45) Date of Patent: Mar. 6, 2007

(54) SYSTEM FOR CONTROLLING RECORDING AND REPRODUCING DATA USING MANAGEMENT INFORMATION ON THE MEDIUM

(75) Inventors: Yoshiya Nonaka, Kawagoe (JP); Ryoji Sugino, Tokyo-to (JP); Akihiro Denda, Kawagoe (JP)

(73) Assignees: Pioneer Corporation, Tokyo-to (JP); Tech Experts Incorporation, Tokyo-to (JP)

( * ) Notice: Subject to any disclaimer, the term of this patent is extended or adjusted under 35 U.S.C. 154(b) by 179 days.

(21) Appl. No.: 10/454,529

(22) Filed: Jun. 5, 2003

(65) Prior Publication Data

US 2003/0227833 A1  Dec. 11, 2003

(30) Foreign Application Priority Data

Jun. 11, 2002  (JP)  ............................ P2002-169852

(51) Int. Cl.
*G11B 21/08* (2006.01)
(52) U.S. Cl. .............................. 369/30.05; 369/30.19; 369/47.12
(58) Field of Classification Search ............. 369/30.05, 369/30.19, 47.12, 84, 30.09, 30.29, 30.28, 369/30.3, 83; 707/104.1
See application file for complete search history.

(56) References Cited

U.S. PATENT DOCUMENTS

| | | | |
|---|---|---|---|
| 5,751,672 A | | 5/1998 | Yankowski |
| 5,764,607 A | * | 6/1998 | Maeda et al. ............. 369/47.12 |
| 6,031,795 A | * | 2/2000 | Wehmeyer ............... 369/30.28 |
| 6,034,925 A | * | 3/2000 | Wehmeyer ............... 369/30.28 |
| 6,061,680 A | | 5/2000 | Scherf et al. |
| 6,272,088 B1 | * | 8/2001 | Aramaki et al. ......... 369/53.24 |
| 6,614,732 B2 | * | 9/2003 | Nonaka et al. ........... 369/30.18 |
| 6,615,363 B1 | * | 9/2003 | Fukasawa ...................... 714/5 |
| 6,691,149 B1 | * | 2/2004 | Yokota et al. .............. 709/201 |
| 2001/0033531 A1 | | 10/2001 | Ozawa et al. | |

FOREIGN PATENT DOCUMENTS

| | | | | |
|---|---|---|---|---|
| EP | 0 997 812 A1 | | 5/2000 | |
| JP | 9-198793 | * | 7/1997 | ............. 369/30.07 |
| WO | WO 98/25269 A1 | | 6/1998 | |
| WO | WO 02/43395 A2 | | 5/2002 | |

\* cited by examiner

*Primary Examiner*—Tan Dinh
(74) *Attorney, Agent, or Firm*—Sughrue Mion, PLLC

(57) ABSTRACT

An information reproducing/recording system has a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus. The control apparatus acquires first management information for program information recorded on the first recording medium, and acquires second management information for program information recorded on the second recording medium. And then, the control apparatus compares the first management information and the second management information, and judges based on the result of comparison whether program information corresponding to the first management information has been recorded on the second recording medium. And if the program information corresponding to the first management information has been recorded on the second recording medium, the control apparatus judges whether a predetermined recording condition is satisfied, and if the recording condition is satisfied, controls the reproducing apparatus and the recording/reproducing apparatus so as to record the program information recorded on the first recording medium onto the second recording medium.

46 Claims, 7 Drawing Sheets

SYSTEM FOR CONTROLLING RECORDING AND REPRODUCING DATA USING MANAGEMENT INFORMATION ON THE MEDIUM

BACKGROUND OF THE INVENTION

1. Field of the Invention

The present invention relates to an information reproducing/recording system and information reproducing/recording method. More particularly, it relates to a system and method capable of searching for various information and performing other processes using management information recorded on recording medium.

2. Description of the Related Art

In addition to program information such as music data, recording media such as optical disc and magnetic disc record TOC (Table Of Contents) information as management information for the program information. The TOC information contains, for example, the absolute time for the start position of each piece of music data on the recording medium and the end position of the last piece of music data. The difference between the start position of one piece of music data and the start position of the next piece of music data corresponds to the play-time of one piece of music data.

Conventional information reproducing/recording systems search for various information and perform other processes using such TOC information. For example, in an information reproducing/recording system having a CD reproducing apparatus which reproduces program information recorded on a CD (compact disc), a HD recording/reproducing apparatus which records the program information reproduced onto an HD (hard disc) and reproduces it, a control apparatus which controls the operations of the CD reproducing apparatus and HD recording/reproducing apparatus, etc., the control apparatus compares the TOC information for the program information between the CD and HD to determine whether the program information recorded on the CD has already been recorded on the HD. If it is found that the TOC information matches between the CD and HD, the control apparatus keeps the program information reproduced from the CD from being recorded on the HD, considering that the same program information as that on the CD has already been recorded on the HD.

Also, information databases (e.g., installed on Web servers on the Internet) have been known in which identification information (e.g., titles) for large quantities of program information and TOC information for each piece of the program information are registered being associated with each other. When the program information recorded on the CD is recorded on the HD, the conventional information reproducing/recording system, under the control of the controller, acquires TOC information about the program information, searches the information database for identification information associated with the TOC information, acquires the identification information, and records it by associating it with the program information to be recorded on the HD.

However, since TOC information concerns the absolute time (or play-time) for the start position of each piece of program information, the same TOC information may exist for different program information. Consequently, even if program information contained on the CD has not been actually recorded on the HD, it sometimes happens that program information is not recorded onto the HD, being considered to have already been recorded on the HD. Also, when acquiring identification information based on TOC information, wrong identification information could be attached to program information. This tendency is especially noticeable when a small quantity of program information has been recorded on the CD.

SUMMARY OF THE INVENTION

It is therefore an object of the present invention to provide an information reproducing/recording system, an information reproducing/recording method, and an information recorded medium which can effectively supplement searches for various information carried out using management information for program information.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; a second management information acquisition device which acquires second management information for program information recorded on the second recording medium; an information checking device which compares the first management information and the second management information, and judges based on the result of comparison whether program information corresponding to the first management information has been recorded on the second recording medium; and an information recording control device which if the program information corresponding to the first management information has been recorded on the second recording medium, judges whether a predetermined recording condition is satisfied, and if the recording condition is satisfied, controls the reproducing apparatus and the recording/reproducing apparatus so as to record the program information recorded on the first recording medium onto the second recording medium.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; a second management information acquisition device which acquires second management information for program information recorded on the second recording medium; a management information comparing device which compares the first management information and the second management information; and an information recording control device (8) which if the first management information and the second management information are coincident with each other, judges whether a predetermined recording condition is satisfied, and if the recording condition is satisfied, controls the reproducing apparatus and the recording/reproducing apparatus so as to record the program information recorded on the first recording medium onto the second recording medium.

Here, for example, the first recording medium may be CD, DVD (Digital Versatile Disc), MD, MO, HD, or card-type recording medium. For example, the second recording medium may be HD, CD-R, DVD-R/W, MD, MO, or card-type recording medium.

According to the present invention, even if comparison between the first management information and second management information results in an erroneous judgment that the program information corresponding to the first management information has been recorded on the second recording medium, it is judged whether a predetermined recording condition is satisfied, and if the recording condition is satisfied, the program information recorded on the first recording medium is recorded onto the second recording medium. Thus, it can effectively supplement the judgment made based on the comparison between the first management information and second management information and can properly record program information not contained on the second recording medium from the first recording medium onto the second recording medium.

In one aspect of the information reproducing/recording system of the present invention, the information recording control device prompts a user to select whether to record the program information recorded on the first recording medium onto the second recording medium, and judges based on the result of selection whether the recording condition is satisfied.

According this aspect, even if comparison between the first management information and second management information results in an erroneous judgment that the program information corresponding to the first management information has been recorded on the second recording medium, the user is prompted to select whether to record the program information recorded on the first recording medium onto the second recording medium, the program information recorded on the first recording medium is recorded onto the second recording medium based on the result of selection. Thus, it can effectively supplement the judgment made based on the comparison between the first management information and second management information and can properly record program information not contained on the second recording medium from the first recording medium onto the second recording medium.

In another aspect of the information reproducing/recording system of the present invention, the information recording control device prompts the user to select whether to record the program information recorded on the first recording medium onto the second recording medium, by controlling the reproducing apparatus and the recording/reproducing apparatus so as to alternately reproduce the program information recorded on the first recording medium and the program information recorded on the second recording medium.

According this aspect, the user can judge whether the two pieces of program information reproduced alternately are identical.

In further aspect of the information reproducing/recording system of the present invention, the information recording control device controls the reproducing apparatus and the recording/reproducing apparatus so as to reproduce the program information recorded on the first recording medium and the program information recorded on the second recording medium, compares data between the program information corresponding to the first management information and the program information corresponding to the second management information, and judges based on the result of comparison whether the recording condition is satisfied.

According this aspect, even if comparison between the first management information and second management information results in an erroneous judgment that the program information corresponding to the first management information has been recorded on the second recording medium, the program information recorded on the first recording medium is recorded onto the second recording medium based on the results of data comparison between the program information corresponding to the first management information and the program information corresponding to the second management information. Thus, it can effectively supplement the judgment made based on the comparison between the first management information and second management information and can properly record program information not contained on the second recording medium from the first recording medium onto the second recording medium.

In still further aspect of the information reproducing/recording system of the present invention, the control apparatus further has an information counting device which counts the number of pieces of program information recorded on the first recording medium; and only when the counted number of pieces of program information is more than 1 and less a predetermined number, the information recording control device judges whether the predetermined recording condition is satisfied, and if the recording condition is satisfied, controls the reproducing apparatus and the recording/reproducing apparatus so as to record the program information recorded on the first recording medium onto the second recording medium.

According this aspect, in view of the fact that it is more likely to be judged erroneously that the program information corresponding to the first management information has been recorded on the second recording medium when the number of pieces of program information recorded on the first recording medium is small than when it is large, since it is judged whether the predetermined recording condition is satisfied only when the number of pieces of program information is not more than a predetermined number, it can more effectively supplement the judgment made based on the comparison between the first management information and second management information.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; a second management information acquisition device which acquires second management information for program information recorded on the second recording medium; an information checking device which compares the first management information and the second management information, and judges based on the result of comparison whether program information corresponding to the first management information has been recorded on the second recording medium; and an information recording control device which if program information corresponding to the first management information has been recorded on the second recording medium, controls the reproducing apparatus and the recording/reproducing apparatus so as to erase the program information recorded on the second recording medium and to record the program information recorded on the first recording medium onto the second recording medium.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; a second management information acquisition device which acquires second management information for program information recorded on the second recording medium; a management information comparing device which compares the first management information and the second management information; and an information recording control device which if the first management information and the second management information are coincident with each other, controls the reproducing apparatus and the recording/reproducing apparatus so as to erase the program information recorded on the second recording medium and to record the program information recorded on the first recording medium onto the second recording medium.

According to the present invention, if it is judged that program information corresponding to the first management information has been recorded on the second recording medium, the program information recorded on the second recording medium is erased, and the program information recorded on the first recording medium is recorded on the second recording medium. Thus, even if the program information must be recorded on the second recording medium anew because the existing program information on the second recording medium has been affected by noise or vibration, the program information on the second recording medium can be replaced with the same, but fresh program information, saving the user the trouble of erasing the program information manually.

In one aspect of the information reproducing/recording system of the present invention, the information recording control device prompts the user to select whether to erase the program information recorded on the second recording medium, and controls based on the result of selection the reproducing apparatus and the recording/reproducing apparatus so as to erase the program information recorded on the second recording medium and to record the program information recorded on the first recording medium onto the second recording medium.

According this aspect, even if comparison between the first management information and second management information results in an erroneous judgment that the program information corresponding to the first management information has been recorded on the second recording medium, the user is prompted to select whether to record the program information recorded on the first recording medium onto the second recording medium, the program information recorded on the second recording medium is erased based on the result of selection, the program information recorded on the first recording medium is recorded on the second recording medium. Thus, it can effectively supplement the judgment made based on the comparison between the first management information and second management information and can prevent program information from being erased by mistake when two pieces of program information are actually different.

In another aspect of the information reproducing/recording system of the present invention, the information recording control device prompts the user to select whether to erase the program information recorded on the second recording medium, by controlling the reproducing apparatus and the recording/reproducing apparatus so as to alternately reproduce the program information recorded on the first recording medium and the program information recorded on the second recording medium.

According this aspect, the user can judge whether the two pieces of program information reproduced alternately are identical.

In further aspect of the information reproducing/recording system of the present invention, the control apparatus further has an information counting device which counts the number of pieces of program information recorded on the first recording medium; and only when the counted number of pieces of program information is more than 1 and less a predetermined number, the information recording control device prompts the user to select whether to erase the program information recorded on the second recording medium.

According this aspect, in view of the fact that it is more likely to be judged erroneously that the program information corresponding to the first management information has been recorded on the second recording medium when the number of pieces of program information recorded on the first recording medium is small than when it is large, since the user is prompted to select whether to erase the program information recorded on the second recording medium only when the number of pieces of program information is not more than a predetermined number, it can more effectively supplement the judgment made based on the comparison between the first management information and second management information.

In further aspect of the information reproducing/recording system of the present invention, the information recording control device controls the reproducing apparatus and the recording/reproducing apparatus so as to reproduce the program information recorded on the first recording medium and the program information recorded on the second recording medium, compares data between the program information corresponding to the first management information and the program information corresponding to the second management information, and controls based on the result of comparison the reproducing apparatus and the recording/reproducing apparatus so as to erase the program information recorded on the second recording medium and to record the program information recorded on the first recording medium onto the second recording medium.

According this aspect, even if comparison between the first management information and second management information results in an erroneous judgment that the program information corresponding to the first management information has been recorded on the second recording medium, the program information recorded on the second recording medium is erased based on the results of data comparison between the program information corresponding to the first management information and the program information corresponding to the second management information, and the program information recorded on the first recording medium is recorded on the second recording medium. Thus, it can effectively supplement the judgment made based on the comparison between the first management information and second management information and can prevent program information from being erased by mistake when two pieces of program information are actually different.

In further aspect of the information reproducing/recording system of the present invention, the control apparatus further has an information counting device which counts the number of pieces of program information recorded on the first recording medium; and only when the counted number of pieces of program information is more than 1 and less a predetermined number the information recording control device compares data between the program information corresponding to the first management information and the program information corresponding to the second management information.

According this aspect, in view of the fact that it is more likely to be judged erroneously that the program information corresponding to the first management information has been recorded on the second recording medium when the number of pieces of program information recorded on the first recording medium is small than when it is large, since the data between the program information and the program information is compared only when the number of pieces of program information is not more than a predetermined number, it can more effectively supplement the judgment made based on the comparison between the first management information and second management information.

In still further aspect of the information reproducing/recording system of the present invention, the information recording control device controls so as to replace the program information recorded on the second recording medium with the program information recorded on the first recording medium.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; an identification information acquisition device which acquires identification information for program information associated with the acquired first management information by referring to an information database in which management information corresponding to each piece of program information and identification information corresponding to each piece of the program information are registered being associated with each other; an information counting device which counts the number of pieces of program information recorded on the first recording medium; a first identification information determining device which if a plurality of pieces of identification information are acquired and the counted number of pieces of program information is more than 1 and less a predetermined number, prompts the user to select one of the plurality of pieces of identification information, and determines one piece of identification information selected by the user; and an identification information recording device which, when the program information recorded on the first recording medium is recorded onto the second recording medium, records the determined one piece of identification information by associating it with the program information to be recorded on the second recording medium.

According to the present invention, in view of the fact that when identification information (e.g., a title) is attached to program information automatically (e.g., the piece of identification information with the highest probability is attached from among a plurality of pieces of identification information), wrong identification information is more likely to be attached to the program information when the number of pieces of program information recorded on the first recording medium is small than when it is large, therefore, the selection of identification information is left up to the user when the number of pieces of program information is small. Thus, it can effectively supplement search for identification information carried out based on the management information. Also, it can prevent wrong identification information from being attached to program information. Furthermore, it can provide, at the same time, the convenience of attaching identification information automatically and assurance that identification information is attached accurately.

In one aspect of the information reproducing/recording system of the present invention, the control apparatus further comprises a second identification information determining device which if a plurality of pieces of identification information are acquired and the counted number of pieces of program information is larger than the predetermined number, determines one piece of identification information with the highest probability from among the plurality of pieces of identification information, the identification information recording device records one piece of identification information determined by the first identification information determining device or second identification information determining device by associating it with the program information to be recorded on the second recording medium.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; a text information acquisition device which judges whether text information for the program information can be acquired from the first recording medium, and if it can be acquired, acquires the text information; an identification information acquisition device which acquires identification information for program information associated with the acquired first management information by referring to an information database in which management information corresponding to each piece of program information and identification information corresponding to each piece of the program information are registered being associated with each other; an identification information presence checking device which if a plurality of pieces of identification information are acquired and the text information is acquired, judges whether any one piece of identification information has been contained in the text information; a third identification information determining device which if any one piece of identification information has been contained in the text information, determines said one piece of identification information; and an identification information recording device which, when the program information recorded on the first recording medium is recorded onto the second recording medium, records one piece of identification information determined by the third identification information determining device by associating it with the program information to be recorded on the second recording medium.

According to the present invention, since any one piece of identification information contained in the text information is attached to program information from among a plurality of pieces of identification information acquired based on management information, it can effectively supplement search for identification information carried out based on the management information. Thus, it can prevent wrong identification information from being attached to program information.

In one aspect of the information reproducing/recording system of the present invention, the control apparatus further has a fourth identification information determining device which if no piece of identification information has been contained in the text information or no text information can be acquired, prompts the user to select one piece of identification information and determines said one piece of identification information selected by the user, wherein the identification information recording device records one piece of identification information determined by the third identification information determining device or fourth identification information determining device by associating it with the program information to be recorded on the second recording medium.

In another aspect of the information reproducing/recording system of the present invention, the controller further has information counting device which counts the number of pieces of program information recorded on the first recording medium; and only when the counted number of pieces of program information is more than 1 and less a predetermined number, the identification information presence checking device judges whether any one piece of identification information has been contained in the text information.

The above object of the present invention can be achieved by an information reproducing/recording system provided with a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus has: a first management information acquisition device which acquires first management information for program information recorded on the first recording medium; an identification information acquisition device which acquires identification information for program information associated with the acquired first management information by referring to an information database in which management information corresponding to each piece of program information and identification information corresponding to each piece of the program information are registered being associated with each other; a user registration judging device which if a plurality of pieces of identification information are acquired, judges, by referring to a user-entered information database in which identification information entered by a user in advance is registered, whether any one piece of identification information has been registered in the user-entered information database; a fifth identification information determining device which if any one piece of identification information has been registered in the user-entered information database, determines said one piece of identification information; an identification information storage device which, when the program information recorded on the first recording medium is recorded onto the second recording medium, records one piece of identification information determined by the fifth identification information determining device by associating it with the program information to be recorded on the second recording medium.

According to the present invention, since any one piece of the identification information registered in the user-entered information database is attached to program information from among a plurality of pieces of identification information acquired based on management information, it can more effectively supplement search for identification information carried out based on the management information. Thus, it can prevent wrong identification information from being attached to program information.

In one aspect of the information reproducing/recording system of the present invention, the control apparatus further has a sixth identification information determining device which if no piece of the identification information has been registered in the user-entered information database, prompts the user to select one piece of identification information and determines said one piece of identification information selected by the user, wherein the identification information recording device records one piece of identification information determined by the fifth identification information determining device or sixth identification information determining device by associating it with the program information to be recorded on the second recording medium.

In another aspect of the information reproducing/recording system of the present invention, the control apparatus further has an information counting device which counts the number of pieces of program information recorded on the first recording medium; and only when the counted number of pieces of program information is more than 1 and less a predetermined number, the user registration judging device judges whether any one piece of identification information has been registered in the user-entered information database.

The above object of the present invention can be achieved by an information reproducing/recording method for a system which reproduces program information, provided with: a process of acquiring first management information for program information recorded on a first recording medium; a process of acquiring second management information for program information recorded on a second recording medium; a process of comparing the first management information and the second management information, and judging based on the result of comparison whether program information corresponding to the first management information has been recorded on the second recording medium; and a process of, if the program information corresponding to the first management information has been recorded on the second recording medium, judging whether a predetermined recording condition is satisfied, and if the recording condition is satisfied, recording the program information recorded on the first recording medium onto the second recording medium.

In one aspect of the information reproducing/recording method of the present invention, the method has: a process of prompting a user to select whether to record the program information recorded on the first recording medium onto the second recording medium, and judging based on the result of selection whether the recording condition is satisfied.

The above object of the present invention can be achieved by an information reproducing/recording method for a system which reproduces program information, provided with:

a process of acquiring first management information for program information recorded on a first recording medium; a process of acquiring second management information for program information recorded on a second recording medium; a process of comparing the first management information and the second management information, and judging based on the result of comparison whether program information corresponding to the first management information has been recorded on the second recording medium; and a process of, if program information corresponding to the first management information has been recorded on the second recording medium, erasing the program information recorded on the second recording medium and recording the program information recorded on the first recording medium onto the second recording medium.

In one aspect of the information reproducing/recording method of the present invention, the method has: a process of a prompting the user to select whether to erase the program information recorded on the second recording medium, and based on the result of selection, erasing the program information recorded on the second recording medium and recording the program information recorded on the first recording medium onto the second recording medium.

The above object of the present invention can be achieved by an information reproducing/recording method for a system which reproduces program information, provided with: a process of acquiring first management information for program information recorded on a first recording medium; a process of acquiring identification information for program information associated with the acquired first management information by referring to an information database in which management information corresponding to each piece of program information and identification information corresponding to each piece of the program information are registered being associated with each other; a process of counting the number of pieces of program information recorded on the first recording medium; a process of, if a plurality of pieces of identification information are acquired and the counted number of pieces of program information is more than 1 and less a predetermined number, prompting the user to select one of the plurality of pieces of identification information, and determining one piece of identification information selected by the user; and a process of, when the program information recorded on the first recording medium is recorded onto a second recording medium, recording the determined one piece of identification information by associating it with the program information to be recorded on the second recording medium.

The above object of the present invention can be achieved by an information reproducing/recording method for a system which reproduces program information, provided with: a process of acquiring first management information for program information recorded on a first recording medium; a process of judging whether text information for the program information can be acquired from the first recording medium, and if it can be acquired, acquiring the text information; a process acquiring identification information for program information associated with the acquired first management information by referring to an information database in which management information corresponding to each piece of program information and identification information corresponding to each piece of the program information are registered being associated with each other; a process of, if a plurality of pieces of identification information are acquired and the text information is acquired, judging whether any one piece of identification information has been contained in the text information; a process of, if any one piece of identification information has been contained in the text information, determining said one piece of identification information; and a process of, when the program information recorded on the first recording medium is recorded onto a second recording medium, recording the determined one piece of identification information by associating it with the program information to be recorded on the second recording medium.

The above object of the present invention can be achieved by an information reproducing/recording method for a system which reproduces program information, provided with: a process of acquiring first management information for program information recorded on a first recording medium; a process of acquiring identification information for program information associated with the acquired first management information by referring to an information database in which management information corresponding to each piece of program information and identification information corresponding to each piece of the program information are registered being associated with each other; a process of, if a plurality of pieces of identification information are acquired, judging, by referring to a user-entered information database in which identification information entered by a user in advance is registered, whether any one piece of identification information has been registered in the user-entered information database; a process of, if any one piece of identification information has been registered in the user-entered information database, determining said one piece of identification information; a process of, when the program information recorded on the first recording medium is recorded onto a second recording medium, recording the determined one piece of identification information by associating it with the program information to be recorded on the second recording medium.

The above object of the present invention can be achieved by an information recorded medium wherein a program for a computer which controls a reproducing apparatus and a recording/reproducing apparatus so as to reproduce program information recorded on a recording medium and record it on a second medium, is recorded so as to be read by the computer, the program makes the computer function as: acquiring first management information for program information recorded on the first recording medium; acquiring second management information for program information recorded on the second recording medium; comparing the first management information and the second management information, and judging based on the result of comparison whether program information corresponding to the first management information has been recorded on the second recording medium; and if the program information corresponding to the first management information has been recorded on the second recording medium, judging whether a predetermined recording condition is satisfied, and if the recording condition is satisfied, controlling the reproducing apparatus and the recording/reproducing apparatus so as to record the program information recorded on the first recording medium onto the second recording medium.

The above object of the present invention can be achieved by an information recorded medium wherein a program for a computer which controls a reproducing apparatus and a recording/reproducing apparatus so as to reproduce program information recorded on a recording medium and record it on a second medium, is recorded so as to be read by the computer, the program makes the computer function as: acquiring first management information for program information recorded on the first recording medium; acquiring second management information for program information recorded on the second recording medium; comparing the first management information and the second management information, and judging based on the result of comparison whether program information corresponding to the first management information has been recorded on the second recording medium; and if program information corresponding to the first management information has been recorded on the second recording medium, controlling the reproducing apparatus and the recording/reproducing apparatus so as to erase the program information recorded on the second recording medium and to record the program information recorded on the first recording medium onto the second recording medium.

The above object of the present invention can be achieved by an information recorded medium wherein a program for a computer which controls a reproducing apparatus and a recording/reproducing apparatus so as to reproduce program information recorded on a recording medium and record it on a second medium, is recorded so as to be read by the computer, the program makes the computer function as: acquiring first management information for program information recorded on the first recording medium; acquiring identification information for program information associated with the acquired first management information by referring to an information database in which management information corresponding to each piece of program information and identification information corresponding to each piece of the program information are registered being associated with each other; counting the number of pieces of program information recorded on the first recording medium; if a plurality of pieces of identification information are acquired and the counted number of pieces of program information is more than 1 and less a predetermined number, prompting the user to select one of the plurality of pieces of identification information, and determining one piece of identification information selected by the user; and when the program information recorded on the first recording medium is recorded onto the second recording medium, recording the determined one piece of identification information by associating it with the program information to be recorded on the second recording medium.

The above object of the present invention can be achieved by an information recorded medium wherein a program for a computer which controls a reproducing apparatus and a recording/reproducing apparatus so as to reproduce program information recorded on a recording medium and record it on a second medium, is recorded so as to be read by the computer, the program makes the computer function as: acquiring first management information for program information recorded on the first recording medium; judging whether text information for the program information can be acquired from the first recording medium, and if it can be acquired, acquiring the text information; acquiring identification information for program information associated with the acquired first management information by referring to an information database in which management information corresponding to each piece of program information and identification information corresponding to each piece of the program information are registered being associated with each other; if a plurality of pieces of identification information are acquired and the text information is acquired, judging whether any one piece of identification information has been contained in the text information; if any one piece of identification information has been contained in the text information, determining said one piece of identification information; and when the program information recorded on the first recording medium is recorded onto the second recording medium, recording the determined one piece of identification information by associating it with the program information to be recorded on the second recording medium.

The above object of the present invention can be achieved by an information recorded medium wherein a program for a computer which controls a reproducing apparatus and a recording/reproducing apparatus so as to reproduce program information recorded on a recording medium and record it on a second medium, is recorded so as to be read by the computer, the program makes the computer function as: acquiring first management information for program information recorded on the first recording medium; acquiring identification information for program information associated with the acquired first management information by referring to an information database in which management information corresponding to each piece of program information and identification information corresponding to each piece of the program information are registered being associated with each other; if a plurality of pieces of identification information are acquired, judging, by referring to a user-entered information database in which identification information entered by a user in advance is registered, whether any one piece of identification information has been registered in the user-entered information database; if any one piece of identification information has been registered in the user-entered information database, determining said one piece of identification information; when the program information recorded on the first recording medium is recorded onto the second recording medium, recording the determined one piece of identification information by associating it with the program information to be recorded on the second recording medium.

DETAILED DESCRIPTION OF THE PREFERRED EMBODIMENTS

Preferred embodiments of the present invention will be described with reference to the accompanying drawings. Incidentally, described below is an embodiment in which the present invention is applied to an audio system.

(First Embodiment)

According to a first embodiment, it is judged, based on management information, whether program information recorded on a first recording medium has been recorded on a second recording medium and if it is judged that the program information has not been recorded yet, the program information is recorded on the second recording medium, wherein the result of judgment is supplemented effectively. This characteristic process will be described below.

First, configuration and functions of an audio system according to the first embodiment will be described with reference to FIG. 1.

Figure 1:
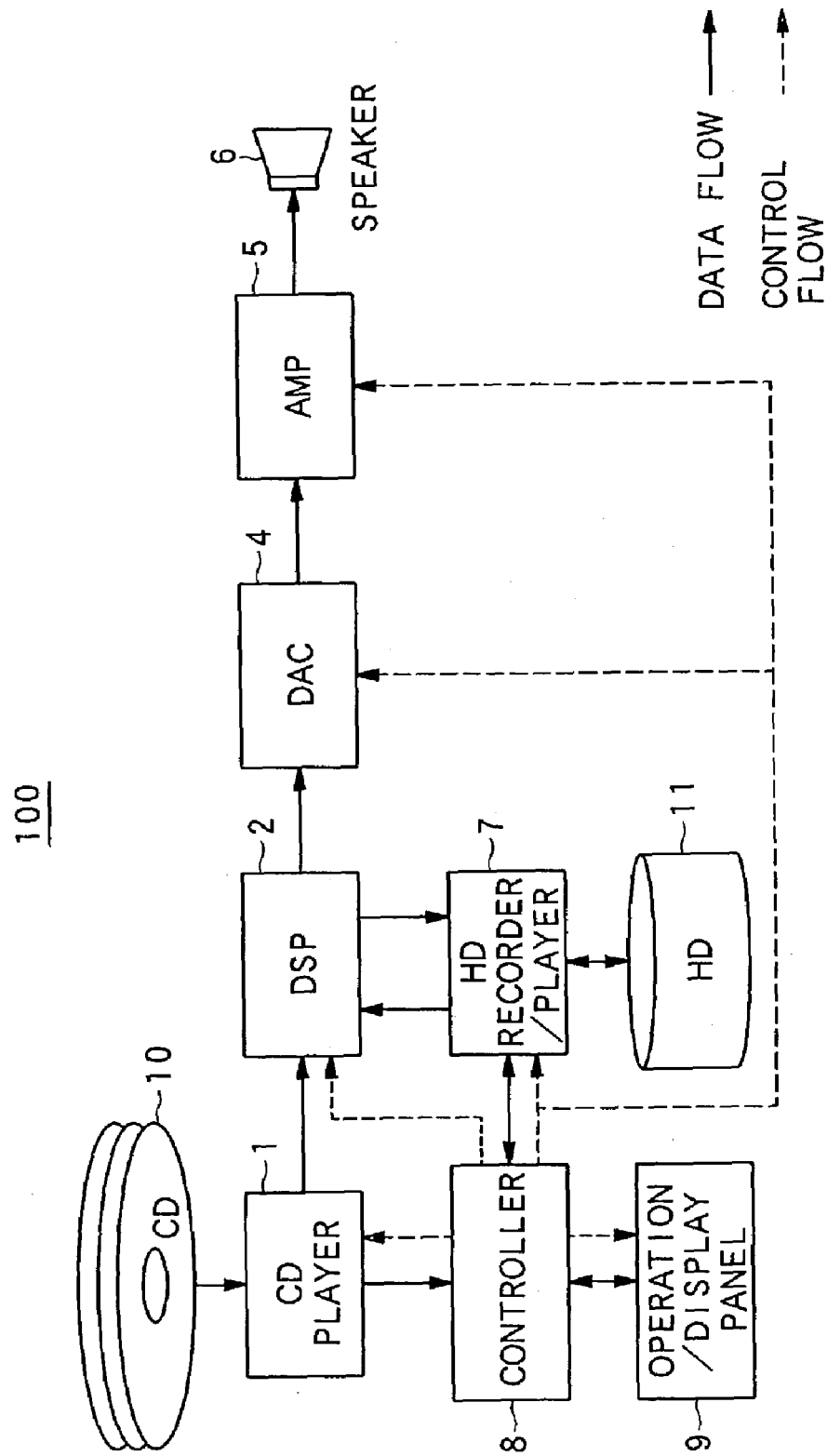
FIG. 1 is a schematic block diagram of an audio system according to embodiments of the present invention.

FIG. 1 is a schematic block diagram of the audio system. As shown in FIG. 1, the audio system 100 includes a CD player 1 as a reproducing apparatus which reproduces program information (music data is cited as an example according to this embodiment) recorded on a CD 10 as a first recording medium, a DSP (Digital Signal Processor) 2 which outputs the music data reproduced by the CD player 1 after performing digital signal processing on them at high speed, a DAC (Digital-to-Analog Converter) 4 which performs digital-to-analog conversion on the music data outputted from the DSP 2 and outputs the resulting analog audio signal, an AMP (Amplifier) 5 which amplifies the analog audio signal received from the DAC 4 and outputs the resulting signal, a speaker 6 which outputs the analog audio signal from the AMP 5 as sound wave, a HD recorder/player 7 as a recording/reproducing apparatus which records the music data from the DSP 2 on the HD 11 as a second recording medium or reproduces music data recorded on the HD 11, a controller 8 as a control apparatus which controls operation of the above components, and an operation/display panel 9 which is equipped with operation buttons for receiving user instructions (e.g., reproducing instruction and recording instruction) and an indicator for displaying identification information (e.g., music titles) corresponding to the music data recorded on the CD 10 or HD 11.

The CD player 1 has a mounting mechanism for mounting the CD 10, a pickup for optically reading the music data recorded on the CD 10, a spindle motor for rotationally driving the CD 10, a servo circuit for servo-controlling the spindle motor and pickup, etc. It reproduces music data (LRCK, BCK, BDATA, C2PO, or other digital data signals) and outputs them to the DSP 2. Also, the CD player 1 reads first TOC information as a first management information recorded in the innermost part of the CD 10 and outputs it to the controller 8. As is well known, the TOC information contains management information such as truck numbers, the number of pieces of music data, and reproducing time (play-time). Besides, the CD player 1 can read text information and outputs it to the controller 8 if the CD 10 is not protected. The text information contains, for example, music titles, the album title, the artist name, and the genre. Since known technology can be used for the CD player 1, detailed description thereof will be omitted. Incidentally, the CD player 1 may be an ATAPI apparatus.

Also, although the CD player 1 is applied to this embodiment as an example of the reproducing apparatus of the present invention, the present invention is not limited to this and may use a DVD player for reproducing music data recorded on DVD, MD player for reproducing music data recorded on MD, or a combination thereof.

The DSP 2 has a logic circuit and a memory circuit. It performs digital signal processing on the music data reproduced by the CD player 1 at high speed. Specifically, it performs known acoustic treatment such as EFM (Eight to Fourteen Modulation) to the music data of RF (Radio Frequency) signal reproduced by the CD player 1. Then, it outputs the music data to the DAC 4 and the HD recorder/player 7.

The HD recorder/player 7 has a buffer memory, a HDD (Hard Disk Drive), etc. The music data outputted from the DSP 2 is stored temporarily in the buffer memory, and then recorded on the HD 11 by the HDD. Moreover, the music data reproduced from the HD 11 by the HDD is stored temporarily in the buffer memory, and then output to the DSP 2.

The HD 11 records a plurality of pieces of music data. Each piece of music data is associated with second TOC information as a second management information. The second TOC information read out of the CD 10 by the CD player 1 is recorded on the HD 11 via the controller 8 and the HD recorder/player 7. If text information can be read out of the CD 10, it may be recorded on the HD 11 being associated with the second TOC information.

An information database has been constructed logically on the HD 11. It records identification information (e.g., music titles) for a large number of pieces of music data and TOC information for individual pieces of music data by associating them with each other. The information registered in the information database may be downloaded from a predetermined server on the Internet. The information database also records the identification information and TOC information for pieces of music data which are not recorded on the CD 10 or HD 11 of this embodiment. That is, the information database is intended to be used to search the TOC information for pieces of music data for the identification information for the pieces of music data.

Since known technology can be applied to the HD recorder/player 7, detailed description thereof will be omitted. Also, although the HD recorder/player 7 is applied to this embodiment as an example of a recording/reproducing apparatus of the present invention, the present invention is not limited to this and may use CD-R recorder/player for recording and reproducing music data on/from a CD-R, DVD-R/W recorder/player for recording and reproducing music data on/from a DVD-R/W, or a combination thereof.

The controller 8 has a CPU which has arithmetic capabilities, a working RAM, a ROM which stores various processing programs and data, etc. It controls reproducing operation of the CD player 1 and recording and reproducing operation of the HD recorder/player 7 based on the instruction from the operation/display panel 9. Also, the controller 8 makes the HD recorder/player 7 acquire the first TOC information and text information outputted from the CD player 1 and record them on the HD 11 by associating them with pieces of music data.

Also, the ROM of the controller 8 stores an information reproducing/recording program, according to which the controller 8 having a computer functions as a first management information acquisition device, a second management information acquisition device, an information checking device (a management information comparing device), a information recording control device, and an information counting device.

Specifically, the controller 8 functions as the first management information acquisition device and acquires the first TOC information for pieces of music data recorded on the CD 10 from the CD player 1. Also, the controller 8 functions as the second management information acquisition device and acquires the second TOC information for all pieces of music data recorded on the HD 11 from the HD recorder/player 7.

Also, the controller 8 functions as the information checking device and compares the acquired first TOC information and second TOC information and judges, based on the results of comparison, whether music data corresponding to the first TOC information has been recorded on the HD 11. For example, the controller 8 checks the second TOC information for any match with the first TOC information, and if any match is found, the controller 8 determines that the music data reproduced from the CD 10 has been recorded on the HD 11.

Furthermore, if music data corresponding to the first TOC information has been recorded on the HD 11, the controller 8 functions as the information recording control device and judges whether a predetermined recording condition is satisfied. If the recording condition is satisfied, the controller 8 controls the CD player 1 and HD recorder/player 7 so as to record the music data (corresponding to the first TOC information) recorded on the CD 10 onto the HD 11. For example, the controller 8 prompts the user to select whether to record the music data recorded on the CD 10 onto the HD 11. Then, based on the result of selection, the controller 8 judges whether the recording condition is satisfied. As a method for prompting the user to make such a selection, for example, the music data recorded on the CD 10 and the music data recorded on the HD 11 are reproduced alternately. Alternatively, a text message prompting the user to select whether to record the music data may be displayed on the operation/display panel 9 or a voice message to the same effect may be output through the speaker 6.

Besides, the controller 8 functions as information counting device and counts the number of pieces of music data recorded on the CD 10.

Next, operation of the audio system according to the first embodiment will be described with reference to FIG. 2.

Figure 2:
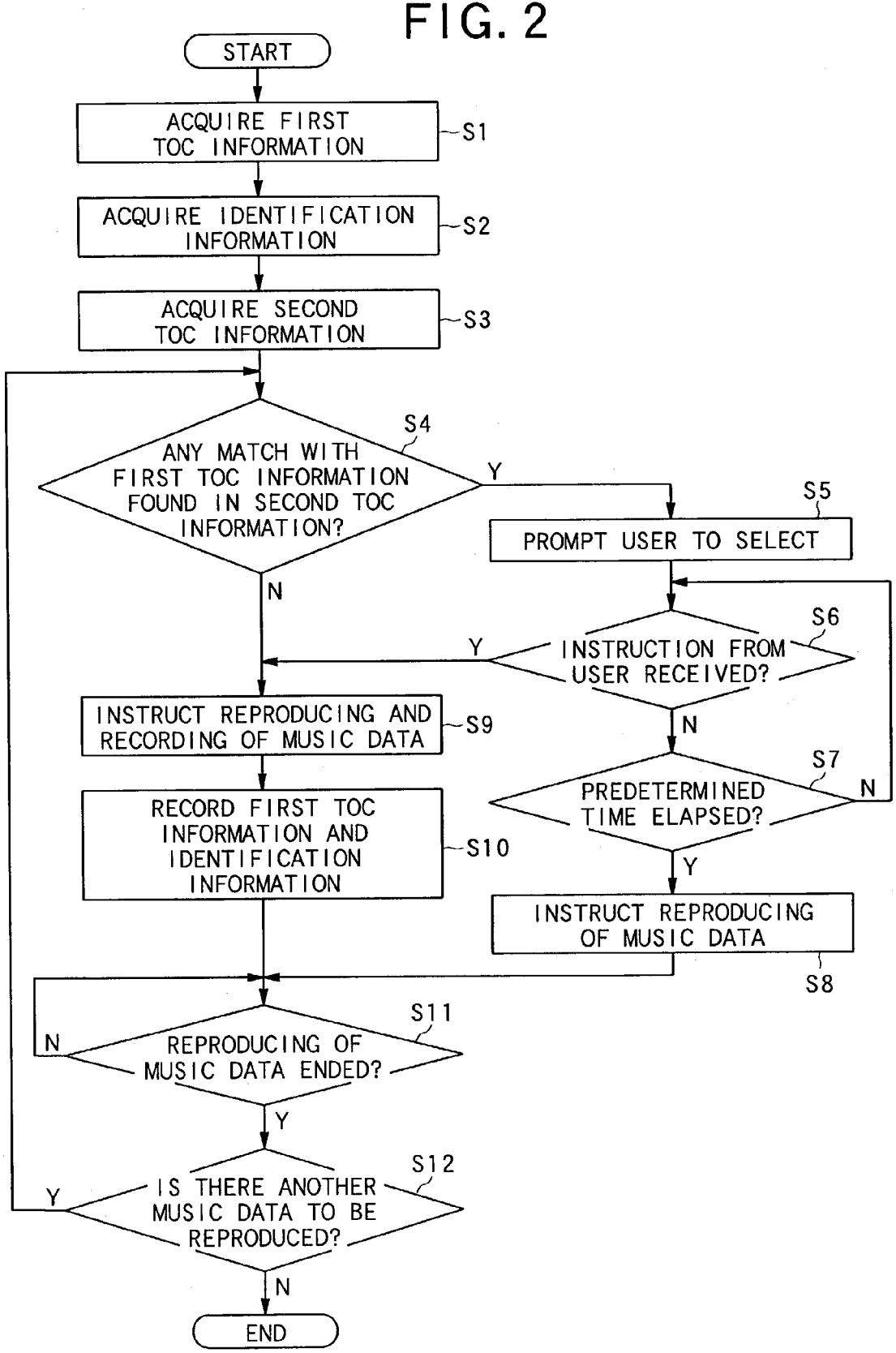
FIG. 2 is a flowchart showing processes performed by a controller 8 when music data recorded on a CD 10 are reproduced and recorded on an HD 11 according to a first embodiment.

FIG. 2 is a flowchart showing processes performed by the controller 8 when the music data recorded on the CD 10 is reproduced and recorded on the HD 11.

In the process of FIG. 2, when the CD 10 is mounted on the CD player 1, the CD player 1 reads the first TOC information recorded in the innermost part of the CD 10 and outputs it to the controller 8. Thus, the controller 8 acquires the first TOC information outputted from the CD player 1 (Step S1). Besides, the CD player 1 reads text information from the CD 10 if possible, and outputs it to the controller 8.

Next, the controller 8 acquires identification information associated with the acquired first TOC information from the information database via the HD recorder/player 7 (Step S2).

When the user gives an instruction to reproduce and record music data recorded on the CD 10 by operating the operation/display panel 9, the controller 8 acquires the second TOC information for all the pieces of music data recorded on the HD 11 via the HD recorder/player 7 (Step S3).

Next, the controller 8 checks the second TOC information for any match with the first TOC information (Step S4), that is, the controller 8 compares the first TOC information and second TOC information, and if no match is found, it goes to Step S9. On the other hand, if any match is found, for example if the first TOC information and the second TOC information are coincident with each other, the controller 8 determines that the piece of music data reproduced from the CD 10 has been recorded on the HD 11, and goes to Step S5.

In Step S5, the controller 8 controls the CD player 1 and HD recorder/player 7 so as to alternately reproduce the music data (corresponding to the first TOC information) recorded on the CD 10 and the music data (corresponding to the second TOC information) recorded on the HD 11. Consequently, the music data recorded on the CD 10 and the music data recorded on the HD 11 which were found to match in Step S4 are reproduced alternately and output to the speaker 6 via the DSP 2, DAC 4, and AMP 5. That is, the user is prompted to select whether to record the music data recorded on the CD 10 onto the HD 11.

When the user presses a Record button on the operation/display panel 9, the controller 8 responds (Step S6) and goes to Step S9. That is, since the user found that they were different music data by listening to the music data reproduced alternately, the user pressed the Record button to give an instruction to record the music data.

On the other hand, if the Record button is not pressed within a predetermined time period (e.g., within 5 seconds after the pieces of music data are reproduced alternately) (Step S7), the controller 8 goes to Step S8 and instructs the CD player 1 to reproducing the music data normally (Step S8). This means that after listening to the pieces of music data reproduced alternately, the user found that they were identical and did not press the Record button. Consequently, the piece of music data recorded on the CD 10 is only reproduced, and is not recorded on the HD 11.

In Step S9, the controller 8 gives a reproducing instruction (command) to the CD player 1, and a recording instruction to the HD recorder/player 7, to record the music data recorded on the CD 10 onto the HD 11 according to the judgment made in Step S4. Consequently, the music data is reproduced from the CD 10, output to the speaker 6 via the DSP 2, DAC 4, and AMP 5, and recorded on the HD 11 via the DSP 2 and HD recorder/player 7. Then, the controller 8 records the appropriate first TOC information and identification information (e.g., music title) on the HD 11 via the HD recorder/player 7 by associating them with the piece of music data (Step S10). Besides, if text information is read out of the CD 10, the controller 8 records it on the HD 11 by associating it with the piece of music data.

Next, the controller 8 judges whether the reproducing of the piece of music data is ended (Step S11). If it is ended, the controller 8 judges whether there is any other piece of music data to be reproduced (Step S12). If there is, the controller 8 returns to Step S4 and repeats the above processes for the other piece of music data. On the other hand, if there is no other piece of music data, the controller 8 ends processing.

As described above, according to the first embodiment, even if comparison between the first TOC information and second TOC information results in an erroneous judgment that the piece of music data corresponding to the first TOC information has been recorded on the HD 11, the user is prompted to select whether to record the piece of music data (corresponding to the first TOC information) recorded on the CD 10 onto the HD 11, and the piece of music data recorded on the CD 10 is recorded on the HD 11 based on the result of selection. Thus, the first embodiment can effectively supplement the judgment made based on the comparison between the first TOC information and second TOC information and can properly record the music data not contained (recorded) on the HD 11 from the CD 10 onto the HD 11.

(Second Embodiment)

According to a second embodiment, it is judged, based on management information, whether program information recorded on a first recording medium has been recorded on a second recording medium and if it is judged that the program information has been recorded, the program information contained (recorded) on the second recording medium is erased and the program information contained (recorded) on the first recording medium is recorded on the second recording medium. This characteristic process will be described below.

An audio system according to the second embodiment has the configuration shown in FIG. 1, as is the case with the first embodiment. Thus, description of those components which have the same functions as the corresponding components of the first embodiment will be omitted.

According to the second embodiment, the controller 8 functions as the first management information acquisition device, the second management information acquisition device, the information checking device, and the information counting device as is the case with the first embodiment, but the information recording control device functions differently from the first embodiment.

Specifically, if the music data corresponding to the first TOC information has been recorded on the HD 11, the controller 8 functions as the information recording control device and controls the CD player 1 and HD recorder/player 7 so as to erase the music data (corresponding to the first TOC information) recorded on the HD 11 and record the music data recorded on the CD 10 onto the HD 11.

Figure 3:
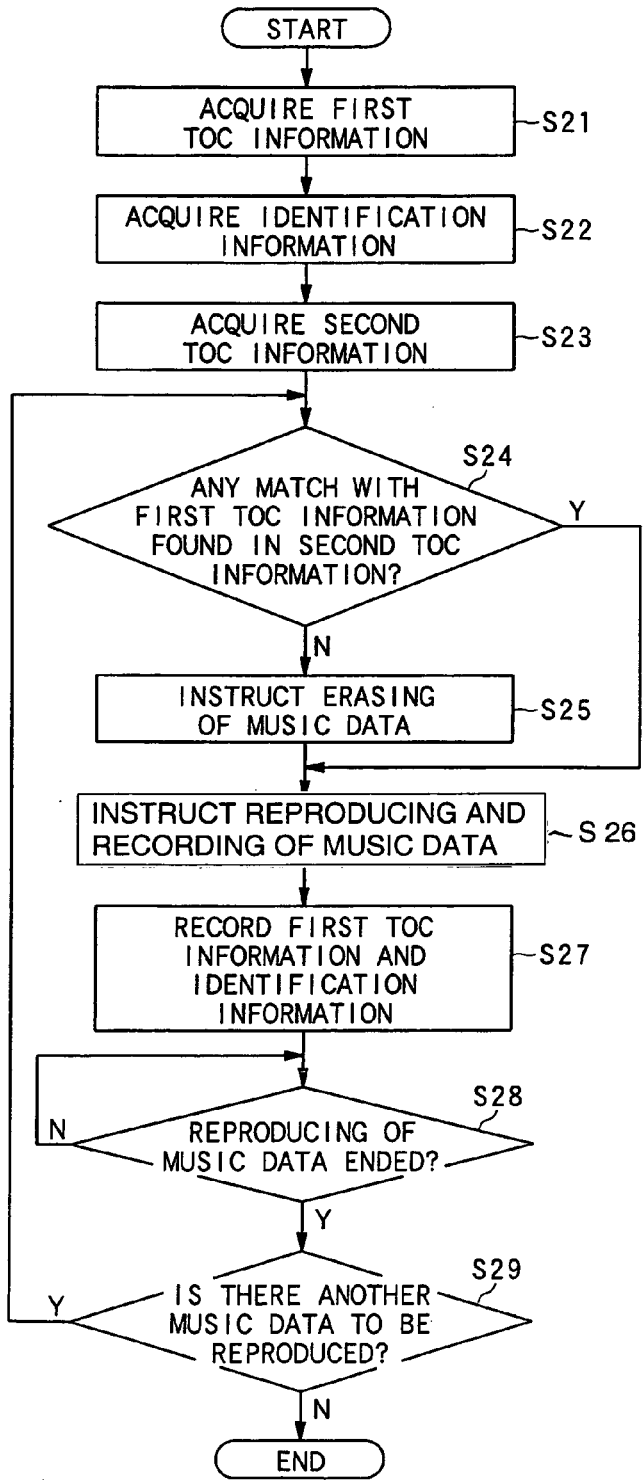
FIG. 3 is a flowchart showing processes performed by a controller 8 when music data recorded on a CD 10 are reproduced and recorded on an HD 11 according to a second embodiment.

FIG. 3 is a flowchart showing processes performed by the controller 8 when the music data recorded on the CD 10 is reproduced and recorded on the HD 11 according to the second embodiment.

In FIG. 3, the processes in Steps S21 to S23 are similar to those of Steps S1 to S3 in FIG. 2.

In Step S24, as with Step S4 in FIG. 2, the controller 8 checks the second TOC information for any match with the first TOC information. If no match is found, it goes to Step S26. On the other hand, if any match is found, the controller 8 determines that the piece of music data reproduced from the CD 10 has been recorded on the HD 11, and goes to Step S25.

In Step S25, the controller 8 instructs the HD recorder/player 7 to erase the same piece of music data as the one corresponding to the first TOC information from the HD 11. Consequently, the piece of music data is erased from the HD 11.

Alternatively, in Step S25, the controller 8 may instruct the HD recorder/player 7 to erase the piece of music data from the HD 11 after receiving an instruction entered by the user on the operation/display panel 9. This is intended to wait a while before erasing a piece of music data recorded on the HD 11 even if it is found in Step S24 that the piece of music data coincides with the one to be reproduced from the CD 10.

In Step S26, the controller 8 gives a reproducing instruction (command) to the CD player 1, and a recording command to the HD recorder/player 7, in order to reproducing the piece of music data corresponding to the first TOC information from the CD 10 and record it on the HD 11. Consequently, the piece of music data is recorded on the HD 11. If the piece of music data has been erased from the HD 11 in Step S25, the controller 8 indicates an address to the HD recorder/player 7 to record the piece of music data corresponding to the first TOC information in the freed area (this area had been recorded the music data erased) of the HD 11. Consequently, the piece of music data recorded on the HD 11 is replaced with the same piece of music data. Then, the controller 8 records the appropriate first TOC information and identification information (e.g., music title) on the HD 11 via the HD recorder/player 7 by associating them with the piece of music data (Step S27). Besides, if text information is read out of the CD 10, the controller 8 records it on the HD 11 by associating it with the piece of music data.

The processes in Step S28 and subsequent steps are similar to those of Step S11 and subsequent steps in the first embodiment, and thus description thereof will be omitted.

As described above, if it is judged, as a result of comparison between the first TOC information and the second TOC information, that the piece of music data corresponding to the first TOC information has been recorded on the HD 11, since the piece of music data being recorded on the HD 11 is erased and the piece of music data being recorded on the CD 10 is recorded onto the HD 11, even if the piece of music data must be recorded on the HD 11 anew because the existing piece of music data on the HD 11 has been affected by noise or vibration, the piece of music data on the HD 11 can be replaced with the same, but fresh piece of music data, saving the user the trouble of erasing the piece of music data manually.

As a variation of the second embodiment, the characteristic process of effectively supplementing the result of judgment as to whether the piece of music data recorded on the CD 10 has been recorded on the HD 11 may be applied to the process of FIG. 3 in the second embodiment as with the first embodiment. Specifically, if any match with the first TOC information is found in the second TOC information in Step S24 of FIG. 3, the controller 8 controls the CD player 1 and HD recorder/player 7 so as to alternately reproduce the piece of music data recorded on the CD 10 and the piece of music data recorded on the HD 11. Consequently, the piece of music data recorded on the CD 10 and the piece of music data recorded on the HD 11 are reproduced alternately and output to the speaker 6 via the DSP 2, DAC 4, and AMP 5, as is the case with the first embodiment. In this way, the user is prompted to select whether to erase the piece of music data recorded on the HD 11.

When the user presses an Erase button on the operation/display panel 9, the controller 8 erases the piece of music data from the HD 11 in Step S25 and goes to Step S26. This means that after listening to the pieces of music data reproduced alternately, the user found that they were identical pieces of music data and pressed the Erase button to erase the piece of music data from the HD 11 and record the new one. On the other hand, if the Erase button is not pressed within a predetermined time period (e.g., within 5 seconds after the piece of music data is reproduced alternately), the controller 8 goes to Step S26, bypassing Step S25.

With this configuration, even if comparison between the first TOC information and second TOC information results in an erroneous judgment that the piece of music data associated with the first TOC information has been recorded on the HD 11, the user is prompted to select whether to record the piece of music data recorded on the CD 10 onto the HD 11, the piece of music data being recorded on the HD 11 is erased based on the result of selection, and the piece of music data being recorded on the CD 10 is recorded on the HD 11. Thus, this configuration can effectively supplement the judgment made based on the comparison between the first TOC information and second TOC information and can prevent piece of music data from being erased by mistake when the two pieces of music data are actually different.

(Third Embodiment)

According to a third embodiment, when program information recorded on a first recording medium is recorded on a second recording medium, identification information (e.g., a title) to be attached to the program information is searched for based on management information, wherein the results of search is supplemented effectively. This characteristic process will be described below.

An audio system according to the third embodiment also has the configuration shown in FIG. 1, as is the case with the first embodiment. Thus, description of those components which have the same functions as the corresponding components of the first embodiment will be omitted.

According to the third embodiment, the controller 8 functions as the first management information acquisition device and the information counting device, as with the first embodiment.

Besides, according to the third embodiment, the controller 8 functions as an identification information acquisition device, a first identification information determining device, a second identification information determining device, and an identification information recording device.

Specifically, the controller 8 functions as the identification information acquisition device and acquires identification information associated with acquired first TOC information by referring to the information database via the HD recorder/player 7. TOC information and identification information are recorded in the information database being associated with each other as described above. The controller 8 searches the information database for TOC information which matches the acquired first TOC information (by comparing data) and acquires identification information associated with the found TOC information. The term "to match the acquired first TOC information" here device not only an exact match. For example, other data (e.g., numeric values) related to the TOC information in the information database are also included if they fall within a range around (below and above) data (e.g., a numeric value) related to the acquired first TOC information.

Also, the controller 8 functions as the first identification information determining device and if a plurality of pieces of identification information are acquired and the number of pieces of music data counted is, for example, four or less, it prompts the user to select one piece of the acquired identification information and determines one piece of identification information selected by the user.

Also, the controller 8 functions as the second identification information determining device and if a plurality of pieces of identification information are acquired and the number of pieces of music data counted is, for example, more than four, it determines one piece of identification information with the highest probability. For example, the controller 8 determines the identification information of the data closest to the data related to the first TOC information out of data (e.g., numeric values) related to the TOC information which is associated with the acquired identification information and which has been recorded in the information database, as the piece of identification information with the highest probability.

Furthermore, the controller 8 functions as the identification information recording device and when it makes the CD player 1 and HD recorder/player 7 record a piece of music data from the CD 10 onto the HD 11, it records the piece of identification information determined by the first identification information determining device or second identification information determining device by associating it with the piece of music data to be recorded on the HD 11. In short, it attaches identification information to the piece of music data.

Figure 4:
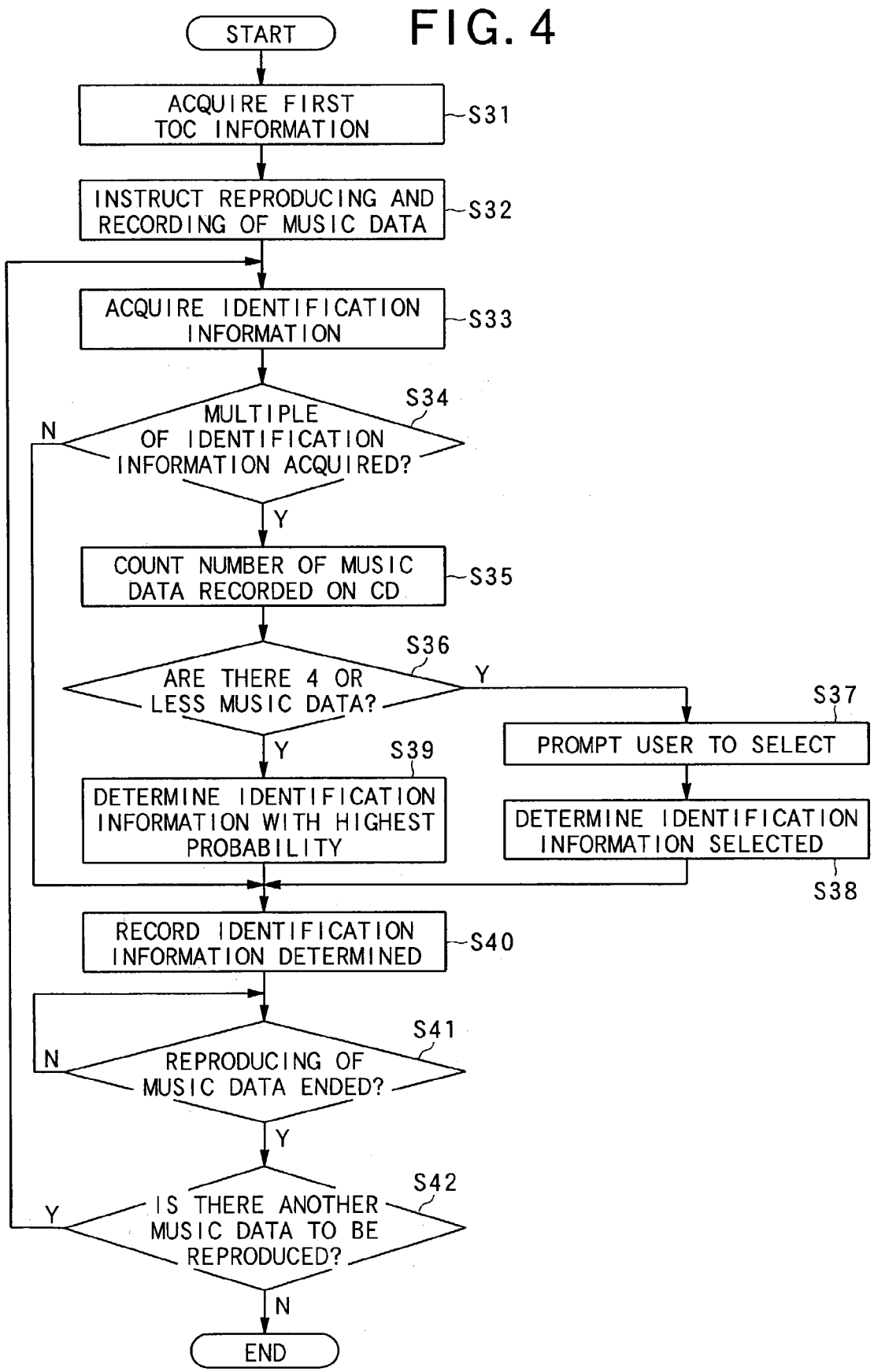
FIG. 4 is a flowchart showing processes performed by a controller 8 when music data recorded on a CD 10 are reproduced and recorded on an HD 11 according to a third embodiment.

FIG. 4 is a flowchart showing processes performed by the controller 8 when the music data recorded on the CD 10 is reproduced and recorded on the HD 11 according to the third embodiment.

In FIG. 4, the process in Step S31 is similar to that of Step S1 in FIG. 2.

When the user gives an instruction to reproducing and recording the music data recorded on the CD 10 by operating the operation/display panel 9, the controller 8 gives a reproducing command to the CD player 1, and a recording command to the HD recorder/player 7 (Step S32). Consequently, the music data is reproduced from the CD 10, output to the speaker 6 via the DSP 2, DAC 4, and AMP 5, and recorded on the HD 11 via the DSP 2 and HD recorder/player 7.

Then, the controller 8 acquires identification information associated with the acquired first TOC information by referring to the information database via the HD recorder/player 7 (Step S33). Incidentally, the first TOC information and identification information here correspond to the first piece of music data reproduced from the CD 10.

Then, the controller 8 judges whether a plurality of pieces of identification information were acquired (Step S34). If a plurality of pieces of identification information were not acquired, the controller 8 goes to Step S40. On the other hand, if a plurality of pieces of identification information were acquired, the controller 8 counts the number of pieces of music data being recorded on the CD 10 (Step S35). For example, it counts the number of pieces of music data based on the first TOC information acquired in Step S31.

Then, the controller 8 judges whether the counted number of pieces of music data is not more than a predetermined number, for example, not more than four (Step S36). Incidentally, the number of pieces cited here is only exemplary. It may be any number between one and three or any number between five and nine. The judgment is made here in order to leave the selection of identification information up to the user when the number of pieces of music data is small in view of the fact that when identification information is attached to pieces of music data automatically (e.g., the piece of identification information with the highest probability is attached from among a plurality of pieces of identification information), wrong identification information is more likely to be attached to the pieces of music data when the number of pieces of music data recorded on the CD 10 is small than when it is large. Incidentally, whether the number of pieces of music data is small or not depends on the accuracy required in the automatic attachment of identification information. Four may be small in some cases and three may be small in other cases.

If it is found in Step S36 that the counted number of pieces of music data is four or less, the controller 8 displays the plurality of pieces of the acquired identification information on the indicator of the operation/display panel 9 (Step S37), prompting the user to select one of them. When the user selects one piece of identification information by pressing a predetermined button on the operation/display panel 9, the controller 8 decides on the selected piece of identification information (Step S38). On the other hand, if it is found in Step S36 that the counted number of pieces of music data exceeds four. The controller 8 decides on the piece of identification information with the highest probability from among the acquired pieces of identification information as described above (Step S39).

In Step S40, the controller 8 records the piece of identification information determined in Step S38 or S39 by associating it with the piece of music data to be recorded on the HD 11. If it is found in Step S34 that a plurality of pieces of identification information were not acquired, one piece of identification information acquired in Step S33 is recorded, being associated with the piece of music data to be recorded on the HD 11.

The processes in Step S41 and subsequent steps are similar to those of Step S11 and subsequent steps in the first embodiment, and thus description thereof will be omitted.

As described above, according to the third embodiment, the selection of identification information is left up to the user when the number of pieces of music data is small in view of the fact that when identification information (e.g., a title) is attached to pieces of music data automatically (e.g., the piece of identification information with the highest probability is attached from among a plurality of pieces of identification information), wrong identification information is more likely to be attached to the pieces of music data when the number of pieces of music data recorded on the CD 10 is small than when it is large. Thus, this embodiment can effectively supplement search for identification information carried out based on the TOC information. Also, it can prevent wrong identification information from being attached to pieces of music data. Furthermore, it can provide, at the same time, the convenience of attaching identification information automatically and assurance that identification information is attached accurately.

(Fourth Embodiment)

According to a fourth embodiment, as with the third embodiment, when program information recorded on a first recording medium is recorded on a second recording medium, identification information (e.g., a title) to be attached to the program information is searched for based on management information, wherein the results of search is supplemented effectively. This characteristic process will be described below.

An audio system according to the fourth embodiment also has the configuration shown in FIG. 1, as is the case with the first embodiment. Thus, description of those components which have the same functions as the corresponding components of the first embodiment will be omitted.

According to the fourth embodiment, the controller 8 functions as the first management information acquisition device and the information counting device, as with the first embodiment. Also, the controller 8 functions as the identification information acquisition device and the identification information recording device, as with the third embodiment.

Furthermore, according to the fourth embodiment, the controller 8 functions as a text information acquisition device, an identification information presence checking device, a third identification information determining device, and a fourth identification information determining device.

Specifically, the controller 8 functions as the text information acquisition device, which judges whether text information for a piece of music data can be acquired from the CD 10 and acquires the text information if it can be acquired. Also, the controller 8 functions as the identification information presence checking device and judges whether any one piece of identification information has been contained in text information if a plurality of pieces of identification information are acquired and the text information is acquired. Also, the controller 8 functions as the third identification information determining device which determines one piece of the identification information contained in the acquired text information. Also, the controller 8 functions as the fourth identification information determining device, which prompts the user to select one piece of the identification information and determines the piece of identification information selected by the user if no piece of the identification information has been contained in the acquired text information or no text information can be acquired.

Figure 5:
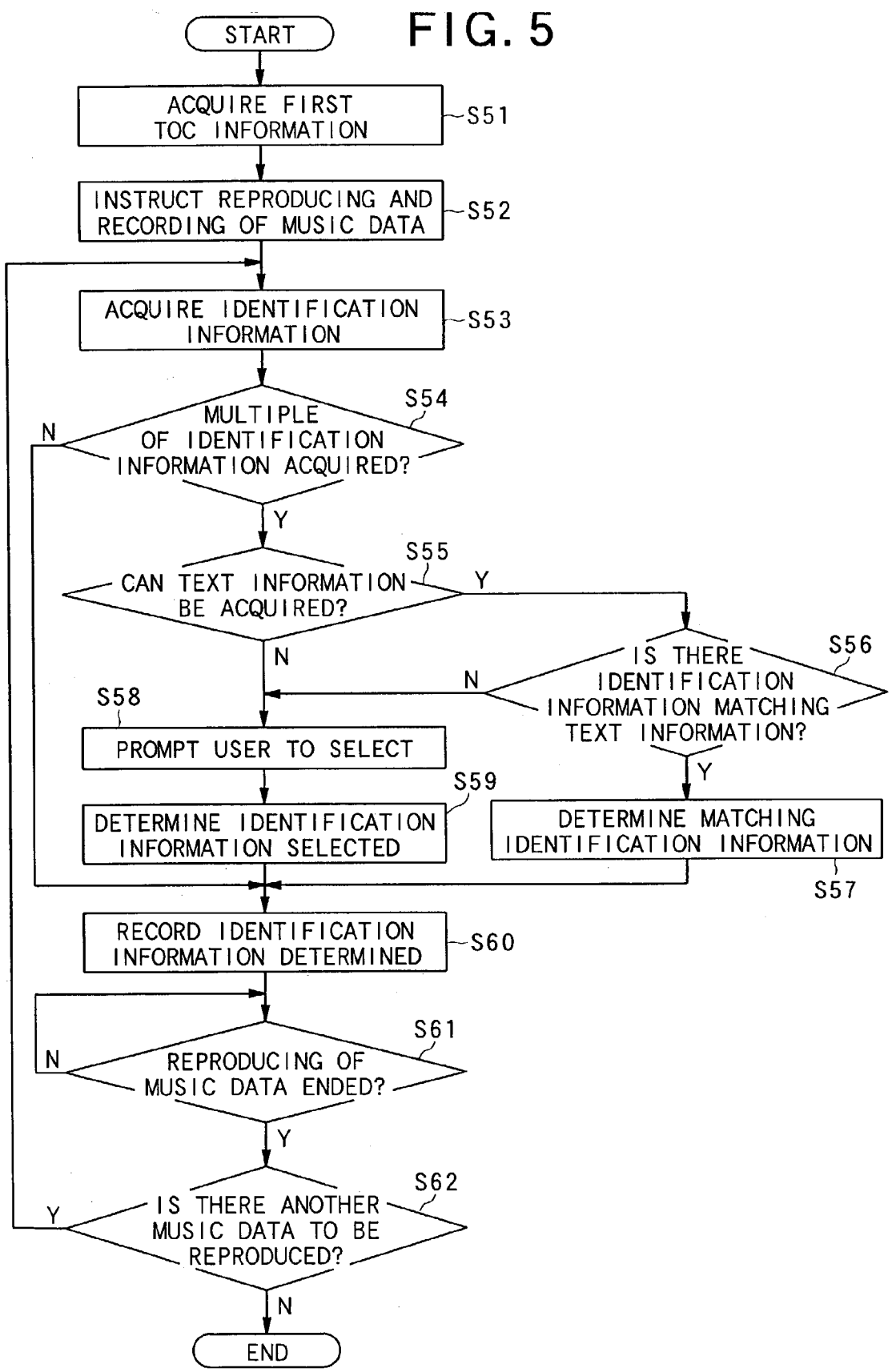
FIG. 5 is a flowchart showing processes performed by a controller 8 when music data recorded on a CD 10 are reproduced and recorded on an HD 11 according to a fourth embodiment.

FIG. 5 is a flowchart showing processes performed by the controller 8 when the music data recorded on the CD 10 is reproduced and recorded on the HD 11 according to the fourth embodiment.

In FIG. 5, the processes in Steps S51 to S53 are similar to those of Steps S31 to S33 in FIG. 4.

Then, the controller 8 judges whether a plurality of pieces of identification information were acquired (Step S54). If it is found that a plurality of pieces of identification information were not acquired, the controller 8 goes to Step S60. On the other hand, if a plurality of pieces of identification information were acquired, the controller 8 judges whether text information for music data can be acquired from the CD 10 (i.e., whether the CD 10 is protected) (Step S55), acquires the text information via the CD player 1 if it can be acquired, and goes to Step S56. On the other hand, if the text information cannot be acquired, the controller 8 goes to Step S58.

In Step S56, the controller 8 judges whether any one piece of the acquired identification information has been contained in the text information, and if it is, the controller 8 determines it (Step S57). In short, if any one piece of the identification information matches the text information, the controller 8 uses it as the identification information to be attached to the piece of music data. On the other hand, if no piece of the identification information matches the text information, the controller 8 goes to Step S58.

In Step S58, the controller 8 displays the plurality of pieces of the acquired identification information on the indicator of the operation/display panel 9, prompting the user to select one of them. When the user selects one piece of identification information by pressing a predetermined button on the operation/display panel 9, the controller 8 determines the selected piece of identification information (Step S59).

Then, the controller 8 records one piece of identification information determined in Step S57 or S59 by associating it with the piece of music data to be recorded on the HD 11 (Step S60). In other words, the identification information is attached to the piece of music data. On the other hand, if it is found in Step S54 that a plurality of pieces of identification information were not acquired, one piece of identification information acquired in Step S53 is recorded, being associated with the piece of music data to be recorded on the HD 11.

The processes in Step S61 and subsequent steps are similar to those of Step S11 and subsequent steps in the first embodiment, and thus description thereof will be omitted.

As described above, since the fourth embodiment attaches any one piece of identification information recorded in the acquired text information to a piece of music data from among a plurality of pieces of acquired identification information based on TOC information, this embodiment can effectively supplement search for identification information carried out based on the TOC information. Thus, it can prevent wrong identification information from being attached to pieces of music data.

Incidentally, the fourth embodiment may adopt part of the processes of the third embodiment so that the controller 8 will judge whether any one piece of the acquired identification information has been contained in the acquired text information only when the number of pieces of music data is not more than a predetermined number, for example, not more than four. In that case, if it is found in Step S54 that a plurality of pieces of identification information were acquired, the controller 8 counts the number of pieces of music data recorded on the CD 10, judges whether the counted number of pieces of music data is four or less, and goes to Step S55 if it is four or less. On the other hand, if the counted number of pieces of music data is more than four, the controller 8 determines one piece of identification information with the highest probability from among the acquired pieces of identification information.

With the above configuration, since the fourth embodiment judges whether any one piece of identification information has been contained in the acquired text information only when the number of pieces of music data is not more than a predetermined number in view of the fact that it is more likely to be judged erroneously that the pieces of music data associated with the first TOC information is recorded on the HD 11 when the number of pieces of music data recorded on the CD 10 is small than when it is large, this embodiment can more effectively supplement search for identification information carried out based on the TOC information.

(Fifth Embodiment)

According to a fifth embodiment, as with the third embodiment, when program information recorded on a first recording medium is recorded on a second recording medium, identification information (e.g., a title) to be attached to the program information is searched for based on management information, wherein the results of search is supplemented effectively. This characteristic process will be described below.

An audio system according to the fifth embodiment also has the configuration shown in FIG. 1, as is the case with the first embodiment. Thus, description of those components which have the same functions as the corresponding components of the first embodiment will be omitted.

According to the fifth embodiment, identification information for the music data entered by the user in advance (hereinafter referred to as user-entered information) has been registered in a user-entered information database constructed logically on the HD 11. The user-entered information is registered in the user-entered information database as the user operates predetermined buttons on the operation/display panel 9.

According to the fifth embodiment, the controller 8 functions as the first management information acquisition device and the information counting device, as with the first embodiment. Also, the controller 8 functions as the identification information acquisition device and the identification information recording device, as with the third embodiment.

Furthermore, according to the fifth embodiment, the controller 8 functions as a user registration judging device, a fifth identification information determining device, and a sixth identification information determining device.

Specifically, the controller 8 functions as the user registration judging device, and if a plurality of pieces of identification information are acquired, it references the user-entered information database on the HD 11 via the HD recorder/player 7 and judges whether any one piece of identification information has been registered in the user-entered information database. Also, the controller 8 functions as the fifth identification information determining device and determines any one piece of identification information that has been registered in the user-entered information database. Also, the controller 8 functions as the sixth identification information determining device, and if no piece of the identification information has been registered in the user-entered information database, it prompts the user to select one piece of the identification information and determines one piece of identification information selected by the user.

Figure 6:
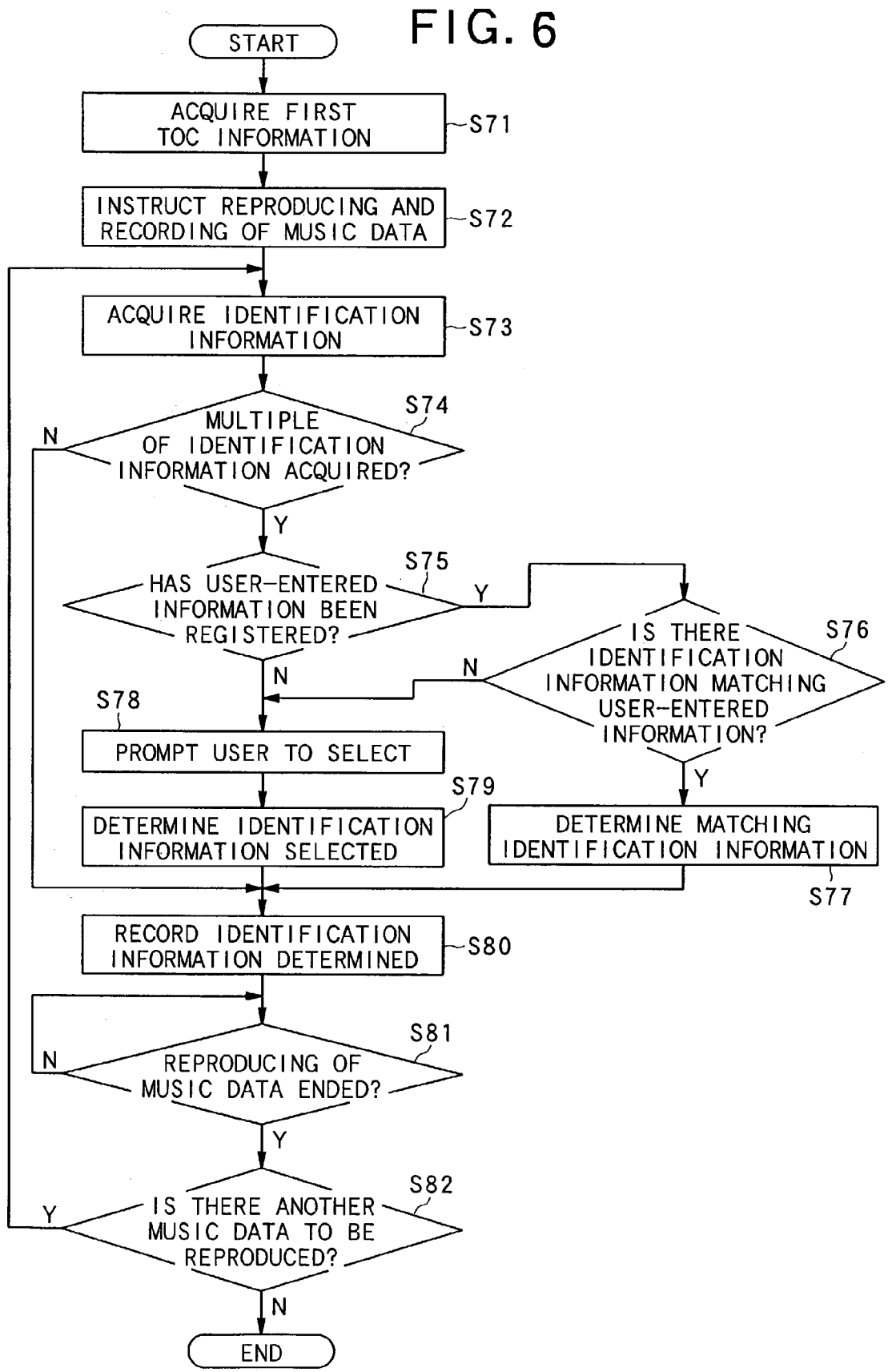
FIG. 6 is a flowchart showing processes performed by a controller 8 when music data recorded on a CD 10 are reproduced and recorded on an HD 11 according to a fifth embodiment.

FIG. 6 is a flowchart showing processes performed by the controller 8 when the music data recorded on the CD 10 is reproduced and recorded on the HD 11 according to the fifth embodiment.

In FIG. 6, the processes in Steps S71 to S73 are similar to those of Steps S31 to S33 in FIG. 4.

Then, the controller 8 judges whether a plurality of pieces of identification information were acquired (Step S74). If it is found that a plurality of pieces of identification information were not acquired, the controller 8 goes to Step S80. On the other hand, if a plurality of pieces of identification information were acquired, the controller 8 references the user-entered information database on the HD 11 via the HD recorder/player 7 and judges whether user-entered information has been registered in the user-entered information database (Step S75). If user-entered information has been registered, the controller 8 judges whether any piece of the acquired identification information matches the user-entered information (Step S76). If it is found as a result that any piece of the identification information has been registered in the user-entered information database, the controller 8 determines this piece of the identification information (Step S77). In short, if any one piece of the identification information matches the user-entered information, the controller 8 uses it as the identification information to be attached to the piece of music data.

On the other hand, if no piece of the identification information has been registered in the user-entered information database, the controller 8 displays the plurality of pieces of the acquired identification information on the indicator of the operation/display panel 9, prompting the user to select one of them (Step S78). When the user selects one piece of the identification information by pressing a predetermined button on the operation/display panel 9, the controller 8 determines the selected piece of identification information (Step S79).

Then, the controller 8 records one piece of identification information determined in Step S77 or S79 by associating it with the piece of music data to be recorded on the HD 11 (Step S80). In other words, the identification information is attached to the piece of music data. On the other hand, if it is found in Step S74 that a plurality of pieces of identification information were not acquired, one piece of identification information acquired in Step S73 is recorded, being associated with the piece of music data to be recorded on the HD 11.

The processes in Step S81 and subsequent steps are similar to those of Step S11 and subsequent steps in the first embodiment, and thus description thereof will be omitted.

As described above, since the fifth embodiment attaches any one piece of identification information registered in the user-entered information database to a piece of music data from among a plurality of pieces of acquired identification information based on TOC information, this embodiment can more effectively supplement search for identification information carried out based on the TOC information. Thus, it can prevent wrong identification information from being attached to pieces of music data.

Incidentally, the fifth embodiment may adopt part of the processes of the third embodiment so that the controller 8 will judge whether any one piece of acquired identification information has been registered in the user-entered information database only when the number of pieces of music data is not more than a predetermined number, for example, not more than four. In that case, if it is found in Step S74 that a plurality of pieces of identification information were acquired, the controller 8 counts the number of pieces of music data recorded on the CD 10, judges whether the counted number of pieces of music data is four or less, and goes to Step S75 if it is four or less. On the other hand, if the counted number of pieces of music data is more than four, the controller 8 determines one piece of identification information with the highest probability from among the acquired pieces of identification information.

With the above configuration, since the fifth embodiment judges whether any one piece of identification information has been registered in the user-entered information database only when the number of pieces of music data is not more than a predetermined number in view of the fact that it is more likely to be judged erroneously that the pieces of music data associated with the first TOC information are recorded on the HD 11 when the number of pieces of music data recorded on the CD 10 is small than when it is large, this embodiment can more effectively supplement search for identification information carried out based on TOC information.

(Sixth Embodiment)

According to a sixth embodiment, which combines the fourth and fifth embodiments, when program information recorded on a first recording medium is recorded on a second recording medium, identification information (e.g., a title) to be attached to the program information is searched for based on management information, wherein the results of search is supplemented effectively. This characteristic process will be described below.

An audio system according to the sixth embodiment also has the configuration shown in FIG. 1, as is the case with the first embodiment. Thus, description of those components which have the same functions as the corresponding components of the first embodiment will be omitted.

Figure 7:
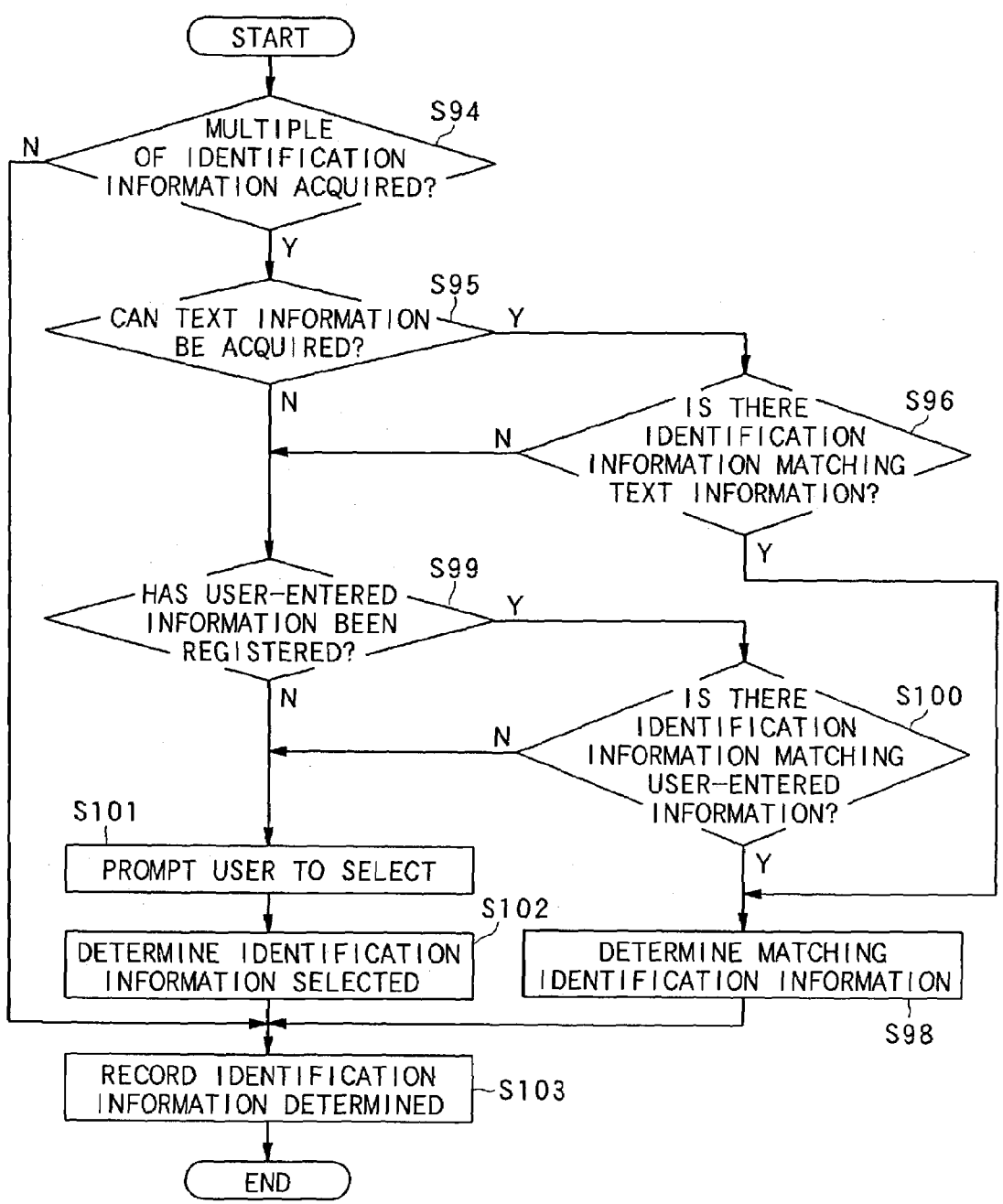
FIG. 7 is a flowchart showing processes performeed by a controller 8 when music data recorded on a CD 10 are reproduced and recorded on an HD 11 according to a sixth embodiment.

FIG. 7 is a flowchart showing processes performed by the controller 8 when the music data recorded on the CD 10 is reproduced and recorded on the HD 11 according to the sixth embodiment.

In FIG. 7, processes similar to those of Steps S31 to S33 in FIG. 4 are performed before Step S94, but they are not shown. Then, the controller 8 judges whether aplurality of pieces of identification information were acquired (Step S94). If it is found that a plurality of pieces of identification information were not acquired, the controller 8 goes to Step S103. On the other hand, if a plurality of pieces of identification information were acquired, the controller 8 judges, as is the case with the fourth embodiment, whether text information for the music data can be acquired from the CD 10 (Step S95), acquires the text information via the CD player 1 if it can be acquired, and goes to Step S96. On the other hand, if the text information cannot be acquired, the controller 8 goes to Step S99.

In Step S96, the controller 8 judges whether any one piece of the acquired identification information has been contained in the text information, and if it is, the controller 8 determines it (Step S98). On the other hand, if no piece of the identification information matches the text information, the controller 8 goes to Step S99.

In Step S99, as is the case with the fifth embodiment, the controller 8 references the user-entered information database on the HD 11 via the HD recorder/player 7 and judges whether user-entered information has been registered in the user-entered information database. If user-entered information has been registered, the controller 8 judges whether any piece of the acquired identification information matches the user-entered information (Step S100). If it is found as a result that any piece of the identification information has been registered in the user-entered information database, the controller 8 decides on this piece of the identification information (Step S98). On the other hand, if no piece of the identification information has been registered in the user-entered information database, the controller 8 displays the plurality of pieces of the acquired identification information on the indicator of the operation/display panel 9, prompting the user to select one of them (Step S101). When the user selects one piece of identification information by pressing a predetermined button on the operation/display panel 9, the controller 8 decides on the selected piece of identification information (Step S102).

Then, the controller 8 records one piece of identification information determined in Step S98 or S102 by associating it with the piece of music data to be recorded on the HD 11 (Step S103). Then, the controller 8 performs processes similar to those in Step S61 and subsequent steps of the fourth embodiment although they are not shown in FIG. 7.

As described above, by combining the fourth and fifth embodiments, the sixth embodiment can supplement search for identification information carried out based on TOC information still more effectively.

Incidentally, although in the sixth embodiment, the judgments in Steps S95 and S96 (including the judgment as to whether to acquire text information from the CD 10) have been given priority over the judgments in Steps S99 and S100 (including the judgment as to whether user-entered information has been registered), priority may be given to the judgments in Steps S99 and S100. In other words, the judgments in Steps S95 and S96 and judgments in Steps S99 and S100 may be interchanged.

As is the case with the fourth and fifth embodiments, the sixth embodiment may adopt part of the processes of the third embodiment so that the controller 8 will perform Step S95 and subsequent steps only when the number of pieces of music data is not more than a predetermined number, for example, not more than four. In that case, if it is found in Step S94 that a plurality of pieces of identification information were acquired, the controller 8 counts the number of pieces of music data recorded on the CD 10, judges whether the counted number of pieces of music data is four or less, and goes to Step S95 if it is four or less. On the other hand, if the counted number of pieces of music data is more than four, the controller 8 decides on the piece of identification information with the highest probability from among the acquired pieces of identification information.

Besides, the first and second embodiments may adopt part of the processes of the third embodiment. Specifically, in the first embodiment, if any match is found in Step S4 of FIG. 2, the controller 8 counts the number of pieces of music data recorded on the CD 10 and judges whether the counted number of pieces of music data is not more than a predetermined number, or example, four or less. If it is four or less, the controller 8 goes to Step S5, where it makes the CD player 1 and HD recorder/player 7 reproducing the piece of music data recorded on the CD 10 and the piece of music data recorded on the HD 11 alternately. On the other hand, if the counted number of pieces of music data is more than four, the controller 8 goes to Step S8 and instructs the CD player 1 to reproducing the piece of music data normally. In other words, the user is prompted to select whether to record the piece of music data recorded on the CD 10 onto the HD 11 when the number of pieces of music data is small in view of the fact that it is more likely to be judged erroneously that a match with the first TOC information was found in the second TOC information when the number of pieces of music data recorded on the CD 10 is small than when it is large.

Similarly, in the variation of the second embodiment, if a match with the first TOC information is found in the second TOC information in Step S24, the controller 8 counts the number of pieces of music data recorded on the CD 10 and judges whether the counted number of pieces of music data is not more than four. If it is not more than a predetermined number, for example, four or less, the controller 8 gives a reproducing command to the CD player 1 and HD recorder/player 7 to make them reproducing the piece of music data recorded on the CD 10 and the piece of music data recorded on the HD 11 alternately. In other words, the user is prompted to select whether to erase the piece of music data recorded on the HD 11 when the number of pieces of music data is small in view of the fact that it is more likely to be judged erroneously that a match with the first TOC information was found in the second TOC information when the number of pieces of music data recorded on the CD 10 is small than when it is large.

In the first embodiment, as an example of judgment made by the information recording control device of the controller 8 as to whether a predetermined recording condition is satisfied, a case has been cited in which the user is prompted to select whether to record the piece of music data recorded on the CD 10 onto the HD 11 and it is judged, based on the result of selection, whether the predetermined recording condition is satisfied. As another example, it is possible to judge whether a predetermined recording condition is satisfied based on data comparison between a piece of music data corresponding to first TOC information and a piece of music data corresponding to second TOC information (e.g., comparison of waveform data obtained by frequency analysis). It is judged that the predetermined recording condition is satisfied, for example, if the piece of music data corresponding to first TOC information matches the piece of music data corresponding to second TOC information or if the piece of music data corresponding to second TOC information falls within an allowable range around the piece of music data corresponding to first TOC information. Incidentally, as with the above case, it is possible to make such a judgment only when the number of pieces of music data is not more than a predetermined number, for example, not more than four.

Also in above variation of the second embodiment, if a match with the first TOC information is found in the second TOC information in Step S24, instead of prompting the user to make a selection, the controller 8 may compare data between a piece of music data corresponding to first TOC information and a piece of music data corresponding to second TOC information (e.g., comparison of waveform data obtained by frequency analysis), erase the piece of music data recorded on the HD 11 if appropriate (if the piece of music data corresponding to first TOC information matches the piece of music data corresponding to second TOC information or if the piece of music data corresponding to second TOC information falls within an allowable range around the piece of music data corresponding to first TOC information) based on the result of comparison, and make the CD player 1 and HD recorder/player 7 record the piece of music from the CD 10 onto the HD 11. Incidentally, as with the above case, the data may be compared only when the number of pieces of music data is not more than a predetermined number, for example, not more than four.

Incidentally, according to the embodiments described above, pieces of music data are recorded as they are on the HD 11. However, they may be recorded on the HD 11 after being compressed in the MP3, ATRAC3, or other format or after being encrypted for copyright protection.

Also, although in the above embodiments, data are recorded in digital format, the data may be converted into analog format by device of an A/D converter before recording.

Also, although in the above embodiments, the reproducing operation of the CD player 1 and recording and reproducing operation of the HD recorder/player 7 are controlled by the single controller 8, they may be controlled separately by two different controllers. In that case, the two controllers will control the reproducing operation of the CD player 1 and recording and reproducing operation of the HD recorder/player 7 in synchronization with each other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-169852 filed on Jun. 11, 2002 including the specification, claims, drawings and summary is incorporated herein by reference in its entirety.

What is claimed is:

1. An information reproducing/recording system comprising:
   a reproducing apparatus which reproduces program information from a first recording medium,
   a recording/reproducing apparatus which records program information on a second recording medium or reproduces program information from the second recording medium, and
   a control apparatus which controls the reproducing apparatus and the recording/reproducing apparatus, wherein the control apparatus comprises:
   a first management information acquisition device which acquires first management information for program information recorded on the first recording medium;
   a second management information acquisition device which acquires second management information for program information recorded on the second recording medium;
   an information recording control device which controls the reproducing apparatus and the recording/reproducing apparatus;
   a first information checking device which compares the first management information and the second management information, and judges based on a result of the comparison whether program information corresponding to the first management information has been recorded on the second recording medium; and
   a second information checking device, which is actuated if it is judged by the first information checking device that the program information corresponding to the first management information has been recorded on the second recording medium, comprising: a prompting device which shows a user a selection of whether or not to record the program information recorded on the first recording medium onto the second recording medium to prompt the user to make a selection; and an input device which receives the selection made by the user and gives an instruction to the information recording control device so as to record the program information on the first recording medium onto the second medium in accordance with the selection by the user, wherein the information recording control device controls the reproducing apparatus and the recording/reproducing apparatus so as to record the program information recorded on the first recording medium onto the second recording medium based upon the instruction.

2. An information reproducing/recording system comprising:

a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

an information recording control device which controls the reproducing apparatus and the recording/reproducing apparatus;

a first information checking device which compares the first management information and the second management information, and judges based on a result of the comparison whether program information corresponding to the first management information has been recorded on the second recording medium; and a second information checking device, which is actuated if it is judged by the first information checking device that the program information corresponding to the first management information has been recorded on the second recording medium, comprising: a prompting device which shows a user a selection of whether or not to record the program information recorded on the first recording medium onto the second recording medium to prompt the user to make a selection; and an input device which receives the selection made by the user and gives an instruction to the information recording control device so as to record the program information on the first recording medium onto the second medium in accordance with the selection by the user, wherein the information recording control device controls the reproducing apparatus and the recording/reproducing apparatus so as to record the program information recorded on the first recording medium onto the second recording medium based upon the instruction, and wherein the second information checking device instructs the reproducing apparatus and the recording/reproducing apparatus to alternately reproduce the program information recorded on the first recording medium and the program information recorded on the second recording medium and the user is prompted to make the selection at least based on the alternately reproduced information recorded on the first and second recording mediums.

3. The information reproducing/recording system according to claim 1, wherein the second information checking device which further instructs the information recording control device not to record the program information on the second recording medium if the selection is not received for a predetermined time period.

4. An information reproducing/recording system comprising:

a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

an information recording control device which controls the reproducing apparatus and the recording/reproducing apparatus;

a management information checking device which compares the first management information and the second management information, and judges based on a result of the comparison whether program information corresponding to the first management information has been recorded on the second recording medium; and a program information checking device which, if it is judged by the management information checking device that the program information corresponding to the first management information has been recorded on the second recording medium, compares the program information recorded on the first recording medium and the program information recorded on the second recording medium, judges based on a result of the comparison whether or not the program information corresponding to the first management information is subject to recording onto the second recording medium; and gives an instruction to the information recording control device to control the recording, wherein the information recording control device controls the reproducing apparatus and the recording/reproducing apparatus so as to record the program information recorded on the first recording medium onto the second recording medium based upon the instruction.

5. An information reproducing/recording system comprising:

a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

an information checking device which compares the first management information and the second management information, and judges based on the result of comparison whether program information corresponding to the first management information has been recorded on the second recording medium; and an information recording control device which if the program information corresponding to the first management information has been recorded on the second recording medium, judges whether a predetermined recording condition is satisfied, and if the recording condition is satisfied, controls the reproducing apparatus and the recording/reproducing apparatus so as to record the program information recorded on the first recording medium onto the second recording medium, wherein:

the control apparatus further comprises an information counting device which counts the number of pieces of program information recorded on the first recording medium; and only when the counted number of pieces of program information is more than 1 and less a predetermined number, the information recording control device judges whether the predetermined recording condition is satisfied, and if the recording condition is satisfied, controls the reproducing apparatus and the recording/reproducing apparatus so as to record the program information recorded on the first recording medium onto the second recording medium.

6. An information reproducing/recording system comprising:

a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

a information recording control device which controls the reproducing apparatus and the recording/reproducing apparatus;

a first information checking device which compares the first management information and the second management information, and a second information checking device, which is actuated if it is judged by the first information checking device that the first management information and the second management information are coincident with each other, comprising: a prompting device which shows a user a selection of whether or not to record the program information recorded on the first recording medium onto the second recording medium to prompt the user to select; and an input device which receives the selection made by the user and gives an instruction to the information recording control device so as to record the program information on the first recording medium onto the second medium in accordance with the selection by the user, wherein the information recording control device controls the reproducing apparatus and the recording/reproducing apparatus so as to record the program information recorded on the first recording medium onto the second recording medium based upon the instruction.

7. All information reproducing/recording system comprising:

a reproducing apparatus which reproduces program information from a first recording medium a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

a information recording control device which controls the reproducing apparatus and the recording/reproducing apparatus;

a first information checking device which compares the first management information and the second management information, and a second information checking device, which is actuated if it is judged by the first information checking device that the first management information and the second management information are coincident with each other, comprising: a prompting device which shows a user a selection of whether or not to record the program information recorded on the first recording medium onto the second recording medium to prompt the user to select and an input device which receives the selection made by the user and gives an instruction to the information recording control device so as to record the program information on the first recording medium onto the second medium in accordance with the selection by the user, wherein the information recording control device controls the reproducing apparatus and the recording/reproducing apparatus so as to record the program information recorded on the first recording medium onto the second recording medium based upon the instruction, and wherein the second information checking device instructs the reproducing apparatus and the recording/reproducing apparatus to alternately reproduce the program information recorded on the first recording medium and the program information recorded on the second recording medium, and the user is prompted to make the selection at least based on the alternately reproduced information recorded on the first and second recording mediums.

8. The information reproducing/recording system according to claim 6, wherein the second information checking device which farther instructs the information recording control device not to record the program information on the first recording medium if the selection is not received for a predetermined time period.

9. An information reproducing/recording system comprising: a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

an information recording control device which controls the reproducing apparatus and the recording/reproducing apparatus;

a management information checking device which compares the first management information and the second management information, and judges based on a result of the comparison whether the first management information and the second management information are coincident with each other; and a program information checking device which, if it is judged by the management information checking device that the first management information and the second management information are coincident with each other, compares the program information recorded on the first recording medium and the program information recorded on the second recording medium, judges based on a result of the comparison whether or not the program information corresponding to the first management information is subject to recording onto the second recording medium; and gives an instruction to the information recording control device to control the recording, wherein the information recording control device controls the reproducing apparatus and the recording/reproducing apparatus so as to record the program information recorded on the first recording medium onto the second recording medium based upon the instruction.

10. An information reproducing/recording system comprising:

a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

a management information comparing device which compares the first management information and the second management information; and an information recording control device which if the first management information and the second management information are coincident with each other, judges whether a predetermined recording condition is satisfied, and if the recording condition is satisfied, controls the reproducing apparatus and the recording/reproducing apparatus so as to record the program information recorded on the first recording medium onto the second recording medium, wherein:

the control apparatus flirt her comprises an information counting device which counts the number of pieces of program information recorded on the first recording medium; and only when the counted number of pieces of program information is more than 1 and less a predetermined number, the information recording control device judges whether the predetermined recording condition is satisfied, and if the recording condition is satisfied, controls the reproducing apparatus and the recording/reproducing apparatus so as to record the program information recorded on the first recording medium onto the second recording medium.

11. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

an information checking device which compares the first management information and the second management information, and judges based on the result of comparison whether program information corresponding to the first management information has been recorded on the second recording medium; and an information recording control device which if program information corresponding to the first management information has been recorded on the second recording medium, controls the reproducing apparatus and the recording/reproducing apparatus so as to erase the program information recorded on the second recording medium and to record the program information recorded on the first recording medium onto the second recording medium.

12. The information reproducing/recording system according to claim 11, wherein the information recording control device prompts the user to select whether to erase the program information recorded on the second recording medium, and controls based on the result of selection the reproducing apparatus and the recording/reproducing apparatus so as to erase the program information recorded on the second recording medium and to record the program information recorded on the first recording medium onto the second recording medium.

13. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

an information checking device which compares the first management information and the second management information, and judges based on the result of comparison whether program information corresponding to the first management information has been recorded on the second recording medium; and an information recording control device which if program information corresponding to the first management information has been recorded on the second recording medium, controls the reproducing apparatus and the recording/reproducing apparatus so as to erase the program information recorded on the second recording medium and to record the program information recorded on the first recording medium onto the second recording medium, wherein the information recording control device prompts the user to select whether to erase the program information recorded on the second recording medium, and controls based on the result of selection the reproducing apparatus and the recording/reproducing apparatus so as to erase the program information recorded on the second recording medium and to record the program information recorded on the first recording medium onto the second recording medium, and wherein the information recording control device prompts the user to select whether to erase the program information recorded on the second recording medium, by controlling the reproducing apparatus and the recording/reproducing apparatus so as to alternately reproduce the program information recorded on the first recording medium and the program information recorded on the second recording medium.

14. The information reproducing/recording system according to claim 12, wherein:

the control apparatus further comprises an information counting device which counts the number of pieces of program information recorded on the first recording medium; and only when the counted number of pieces of program information is more than 1 and less a predetermined number, the information recording control device prompts the user to select whether to erase the program information recorded on the second recording medium.

15. The information reproducing/recording system according to claim 11, wherein the information recording control device controls the reproducing apparatus and the recording/reproducing apparatus so as to reproduce the program information recorded on the first recording medium and the program information recorded on the second recording medium, compares data between the program information corresponding to the first management information and the program information corresponding to the second management information, and controls based on the result of comparison the reproducing apparatus and the recording/reproducing apparatus so as to erase the program information recorded on the second recording medium and to record the program information recorded on the first recording medium onto the second recording medium.

16. The information reproducing/recording system according to claim 15, wherein:

the control apparatus further comprises an information counting device which counts the number of pieces of program information recorded on the first recording medium; and only when the counted number of pieces of program information is more than 1 and less a predetermined number the information recording control device compares data between the program information corresponding to the first management information and the program information corresponding to the second management information.

17. The information reproducing/recording system according to claim 11, wherein the information recording control device controls so as to replace the program information recorded on the second recording medium with the program information recorded on the first recording medium.

18. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

a management information comparing device which compares the first management information and the second management information; and an information recording control device which if the first management information and the second management information are coincident with each other, controls the reproducing apparatus and the recording/reproducing apparatus so as to erase the program information recorded on the second recording medium and to record the program information recorded on the first recording medium onto the second recording medium.

19. The information reproducing/recording system according to claim 18, wherein the information recording control device prompts the user to select whether to erase the program information recorded on the second recording medium, and controls based on the result of selection the reproducing apparatus and the recording/reproducing apparatus so as to erase the program information recorded on the second recording medium and to record the program information recorded on the first recording medium onto the second recording medium.

20. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a second management information acquisition device which acquires second management information for program information recorded on the second recording medium;

a management information comparing device which compares the first management information and the second management information; and an information recording control device which if the first management information and the second management information are coincident with each other, controls the reproducing apparatus and the recording/reproducing apparatus so as to erase the program information recorded on the second recording medium and to record the program information recorded on the first recording medium onto the second recording medium, wherein the information recording control device prompts the user to select whether to erase the program information recorded on the second recording medium, and controls based on the result of selection the reproducing apparatus and the recording/reproducing apparatus so as to erase the program information recorded on the second recording medium and to record the program information recorded on the first recording medium onto the second recording medium, and wherein the information recording control device prompts the user to select whether to erase the program information recorded on the second recording medium, by controlling the reproducing apparatus and the recording/reproducing apparatus so as to alternately reproduce the program information recorded on the first recording medium and the program information recorded on the second recording medium.

21. The information reproducing/recording system according to claim 19, wherein:

the control apparatus flirt her comprises an information counting device which counts the number of pieces of program information recorded on the first recording medium; and only when the counted number of pieces of program information is more than 1 and less a predetermined number, the information recording control device prompts the user to select whether to erase the program information recorded on the second recording medium.

22. The information reproducing/recording system according to claim 18, wherein the information recording control device controls the reproducing apparatus and the recording/reproducing apparatus so as to reproduce the program information recorded on the first recording medium and the program information recorded on the second recording medium, compares data between the program information corresponding to the first management information and the program information corresponding to the second management information, and controls based on the result of comparison the reproducing apparatus and the recording/reproducing apparatus so as to erase the program information recorded on the second recording medium and to record the program information recorded on the first recording medium onto the second recording medium.

23. The information reproducing/recording system according to claim 22, wherein:

the control apparatus flirt her comprises an information counting device which counts the number of pieces of program information recorded on the first recording medium; and only when the counted number of pieces of program information is more than 1 and less a predetermined number the information recording control device compares data between the program information corresponding to the first management information and the program information corresponding to the second management information.

24. The information reproducing/recording system according to claim 18, wherein the information recording control device controls so as to replace the program information recorded on the second recording medium with the program information recorded on the first recording medium.

25. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

an identification information acquisition device which acquires identification information for program information associated with the acquired first management information by referring to an information database in which management information corresponding to each piece of program information and identification information corresponding to each piece of the program information are registered being associated with each other;

an information counting device which counts the number of pieces of program information recorded on the first recording medium;

a first identification information determining device which if a plurality of pieces of identification information are acquired and the counted number of pieces of program information is more than 1 and less a predetermined number, prompts the user to select one of the plurality of pieces of identification information, and determines one piece of identification information selected by the user; and an identification information recording device which, when the program information recorded on the first recording medium is recorded onto the second recording medium, records the determined one piece of identification information by associating it with the program information to be recorded on the second recording medium.

26. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

an identification information acquisition device which acquires identification information for program information associated with the acquired first management information by referring to an information database in which management information corresponding to each piece of program information and identification information corresponding to each piece of the program information are registered being associated with each other;

an information counting device which counts the number of pieces of program information recorded on the first recording medium;

a first identification information determining device which if a plurality of pieces of identification information are acquired and the counted number of pieces of program information is more than 1 and less a predetermined number, prompts the user to select one of the plurality of pieces of identification information, and determines one piece of identification information selected by the user; and an identification information recording device which, when the program information recorded on the first recording medium is recorded onto the second recording medium, records the determined one piece of identification information by associating it with the program information to be recorded on the second recording medium, wherein the control apparatus flirt her comprises a second identification information determining device which if a plurality of pieces of identification information are acquired and the counted number of pieces of program information is larger than the predetermined number, determines one piece of identification information with the highest probability from among the plurality of pieces of identification information, and wherein the identification information recording device records one piece of identification information determined by the first identification information determining device or second identification information determining device by associating it with the program information to be recorded on the second recording medium.

27. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

a text information acquisition device which judges whether text information for the program information can be acquired from the first recording medium, and if it can be acquired, acquires the text information;

an identification information acquisition device which acquires identification information for program information associated with the acquired first management information by referring to an information database in which management information corresponding to each piece of program information and identification information corresponding to each piece of the program information are registered being associated with each other;

an identification information presence checking device which if a plurality of pieces of identification information are acquired and the text information is acquired, judges whether any one piece of identification information has been contained in the text information;

a third identification information determining device which if any one piece of identification information has been contained in the text information, determines said one piece of identification information; and an identification information recording device which, when the program information recorded on the first recording medium is recorded onto the second recording medium, records one piece of identification information determined by the third identification information determining device by associating it with the program information to be recorded on the second recording medium.

28. The information reproducing/recording system according to claim 27, wherein:

the control apparatus fun her comprises a fourth identification information determining device which if no piece of identification information has been contained in the text information or no text information can be acquired, prompts the user to select one piece of identification information and determines said one piece of identification information selected by the user, wherein the identification information recording device records one piece of identification information determined by the third identification information determining device or fourth identification information determining device by associating it with the program information to be recorded on the second recording medium.

29. The information reproducing/recording system according to claim 27, wherein:

the control apparatus fUrther comprises information counting device which counts the number of pieces of program information recorded on the first recording medium; and only when the counted number of pieces of program information is more than 1 and less a predetermined number, the identification information presence checking device judges whether any one piece of identification information has been contained in the text information.

30. An information reproducing/recording system comprising a reproducing apparatus which reproduces program information from a first recording medium, a recording/reproducing apparatus which records program information on a second recording medium or reproduces program information from the second recording medium, and a control apparatus which controls the reproducing apparatus and the recording/reproducing apparatus, wherein the control apparatus comprises:

a first management information acquisition device which acquires first management information for program information recorded on the first recording medium;

an identification information acquisition device which acquires identification information for program information associated with the acquired first management information by referring to an information database in which management information corresponding to each piece of program information and identification information corresponding to each piece of the program information are registered being associated with each other;

a user registration judging device which if a plurality of pieces of identification information are acquired, judges, by referring to a user-entered information database in which identification information entered by a user in advance is registered, whether any one piece of identification information has been registered in the user-entered information database;

a fifth identification information determining device which if any one piece of identification information has been registered in the user-entered information database, determines said one piece of identification information;

an identification information storage device which, when the program information recorded on the first recording medium is recorded onto the second recording medium, records one piece of identification information determined by the fifth identification information determining device by associating it with the program information to be recorded on the second recording medium.

31. The information reproducing/recording system according to claim 30, the control apparatus further comprises a sixth identification information determining device which if no piece of the identification information has been registered in the user-entered information database, prompts the user to select one piece of identification information and determines said one piece of identification information selected by the user, wherein the identification information recording device records one piece of identification information determined by the fifth identification information determining device or sixth identification information determining device by associating it with the program information to be recorded on the second recording medium.

32. The information reproducing/recording system according to claim 20, wherein:

the control apparatus flirt her comprises an information counting device which counts the number of pieces of program information recorded on the first recording medium; and only when the counted number of pieces of program information is more than 1 and less a predetermined number, the user registration judging device judges whether any one piece of identification information has been registered in the user-entered information database.

33. An information reproducing/recording method for a system which reproduces program information, comprising:

a process of acquiring first management information for program information recorded on a first recording medium;

a process of acquiring second management information for program information recorded on a second recording medium;

a process of comparing the first management information and the second management information, and judging based on the result of comparison whether program information corresponding to the first management information has been recorded on the second recording medium; and a process of, if the program information corresponding to the first management information has been recorded on the second recording medium, prompting a user to select whether or not to record the program information recorded on the first recording medium onto the second recording medium, receiving the selection of the user, and transmitting an instruction to record the program information on the first recording medium onto the second recording medium in accordance with the selection by the user.

34. An information reproducing/recording method for a system which reproduces program information, comprising:

a process of acquiring first management information for program information recorded on a first recording medium;

a process of acquiring second management information for program information recorded on a second recording medium;

a process of comparing the first management information and the second management information; and a process of, if the first management information and the second management information are coincident with each other, prompting a user to select whether or not to record the program information recorded on the first recording medium onto the second recording medium, receiving the selection of the user, and transmitting an instruction to record the program information on the first recording medium onto the second recording medium in accordance with the selection by the user.

35. An information reproducing/recording method for a system which reproduces program information, comprising:

a process of acquiring first management information for program information recorded on a first recording medium;

a process of acquiring second management information for program information recorded on a second recording medium;

a process of comparing the first management information and the second management information, and judging based on the result of comparison whether program information corresponding to the first management information has been recorded on the second recording medium; and a process of, if program information corresponding to the first management information has been recorded on the second recording medium, erasing the program information recorded on the second recording medium and recording the program information recorded on the first recording medium onto the second recording medium.

36. An information reproducing/recording method for a system which reproduces program information, comprising:

a process of acquiring first management information for program information recorded on a first recording medium;

a process of acquiring second management information for program information recorded on a second recording medium;

a process of comparing the first management information and the second management information; and a process of, if the first management information and the second management information are coincident with each other, erasing the program information recorded on the second recording medium and recording the program information recorded on the first recording medium onto the second recording medium.

37. An information reproducing/recording method for a system which reproduces program information, comprising:

a process of acquiring first management information for program information recorded on a first recording medium;

a process of acquiring identification information for program information associated with the acquired first management information by referring to an information database in which management information corresponding to each piece of program information and identification information corresponding to each piece of the program information are registered being associated with each other;

a process of counting the number of pieces of program information recorded on the first recording medium;

a process of, if a plurality of pieces of identification information are acquired and the counted number of pieces of program information is more than 1 and less a predetermined number, prompting the user to select one of the plurality of pieces of identification information, and determining one piece of identification information selected by the user; and a process of, when the program information recorded on the first recording medium is recorded onto a second recording medium, recording the determined one piece of identification information by associating it with the program information to be recorded on the second recording medium.

38. An information reproducing/recording method for a system which reproduces program information, comprising:

a process of acquiring first management information for program information recorded on a first recording medium;

a process of judging whether text information for the program information can be acquired from the first recording medium, and if it can be acquired, acquiring the text information;

a process acquiring identification information for program information associated with the acquired first management information by referring to an information database in which management information corresponding to each piece of program information and identification information corresponding to each piece of the program information are registered being associated with each other;

a process of, if a plurality of pieces of identification information are acquired and the text information is acquired, judging whether any one piece of identification information has been contained in the text information;

a process of, if any one piece of identification information has been contained in the text information, determining said one piece of identification information; and a process of, when the program information recorded on the first recording medium is recorded onto a second recording medium, recording the determined one piece of identification information by associating it with the program information to be recorded on the second recording medium.

39. An information reproducing/recording method for a system which reproduces program information, comprising:

a process of acquiring first management information for program information recorded on a first recording medium;

a process of acquiring identification information for program information associated with the acquired first management information by referring to an information database in which management information corresponding to each piece of program information and identification information corresponding to each piece of the program information are registered being associated with each other;

a process of, if a plurality of pieces of identification information are acquired, judging, by referring to a user-entered information database in which identification information entered by a user in advance is registered, whether any one piece of identification information has been registered in the user-entered information database;

a process of, if any one piece of identification information has been registered in the user- entered information database, determining said one piece of identification information;

a process of, when the program information recorded on the first recording medium is recorded onto a second recording medium, recording the determined one piece of identification information by associating it with the program information to be recorded on the second recording medium.

40. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

acquiring second management information for program information recorded on the second recording medium;

comparing the first management information and the second management information, and judging based on the result of comparison whether program information corresponding to the first management information has been recorded on the second recording medium; and if the program information corresponding to the first management information has been recorded on the second recording medium, prompting a user to select whether or not to record the program information recorded on the first recording medium onto the second recording medium, receiving the selection of the user, and transmitting an instruction to record the program information on the first recording medium onto the second recording medium in accordance with the selection by the user.

41. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

acquiring second management information for program information recorded on the second recording medium;

comparing the first management information and the second management information; and if the first management information and the second management information are coincident with each other, prompting a user to select whether or not to record the program information recorded on the first recording medium onto the second recording medium, receiving the selection of the user, and transmitting an instruction to record the program information on the first recording medium onto the second recording medium in accordance with the selection by the user.

42. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

acquiring second management information for program information recorded on the second recording medium;

comparing the first management information and the second management information, and judging based on the result of comparison whether program information corresponding to the first management information has been recorded on the second recording medium; and if program information corresponding to the first management information has been recorded on the second recording medium, controlling the reproducing apparatus and the recording/reproducing apparatus so as to erase the program information recorded on the second recording medium and to record the program information recorded on the first recording medium onto the second recording medium.

43. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

acquiring second management information for program information recorded on the second recording medium;

comparing the first management information and the second management information; and if the first management information and the second management information are coincident with each other, controlling the reproducing apparatus and the recording/reproducing apparatus so as to erase the program information recorded on the second recording medium and to record the program information recorded on the first recording medium onto the second recording medium.

44. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

acquiring identification information for program information associated with the acquired first management information by referring to an information database in which management information corresponding to each piece of program information and identification information corresponding to each piece of the program information are registered being associated with each other;

counting the number of pieces of program information recorded on the first recording medium;

if a plurality of pieces of identification information are acquired and the counted number of pieces of program information is more than 1 and less a predetermined number, prompting the user to select one of the plurality of pieces of identification information, and determining one piece of identification information selected by the user; and when the program information recorded on the first recording medium is recorded onto the second recording medium, recording the determined one piece of identification information by associating it with the program information to be recorded on the second recording medium.

45. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

judging whether text information for the program information can be acquired from the first recording medium, and if it can be acquired, acquiring the text information;

acquiring identification information for program information associated with the acquired first management information by referring to an information database in which management information corresponding to each piece of program information and identification information corresponding to each piece of the program information are registered being associated with each other;

if a plurality of pieces of identification information are acquired and the text information is acquired, judging whether any one piece of identification information has been contained in the text information;

if any one piece of identification information has been contained in the text information, determining said one piece of identification information; and when the program information recorded on the first recording medium is recorded onto the second recording medium, recording the determined one piece of identification information by associating it with the program information to be recorded on the second recording medium.

46. An information recorded medium wherein a program for a computer which controls a reproducing apparatus and a recording/reproducing apparatus so as to reproduce program information recorded on a recording medium and record it on a second medium, is recorded so as to be read and executed by the computer, the program makes the computer function as:

acquiring first management information for program information recorded on the first recording medium;

acquiring identification information for program information associated with the acquired first management information by referring to an information database in which management information corresponding to each piece of program information and identification information corresponding to each piece of the program information are registered being associated with each other;

if a plurality of pieces of identification information are acquired, judging, by referring to a user-entered information database in which identification information entered by a user in advance is registered, whether any one piece of identification information has been registered in the user-entered information database;

if any one piece of identification information has been registered in the user-entered information database, determining said one piece of identification information;

when the program information recorded on the first recording medium is recorded onto the second recording medium, recording the determined one piece of identification information by associating it with the program information to be recorded on the second recording medium.

\* \* \* \* \*